US010015304B2

(12) United States Patent
Lee et al.

(10) Patent No.: US 10,015,304 B2
(45) Date of Patent: Jul. 3, 2018

(54) ELECTRONIC APPARATUS, AUDIO DEVICE, AND METHOD THAT IS PERFORMABLE BY THE ELECTRONIC APPARATUS TO SET NETWORK OF THE AUDIO DEVICE

(71) Applicant: SAMSUNG ELECTRONICS CO., LTD., Suwon-si, Gyeonggi-do (KR)

(72) Inventors: Yong-woo Lee, Hwaseong-si (KR); Wha-seob Sim, Hwaseong-si (KR); Ho-joong Yong, Suwon-si (KR); Chang-heon Yoon, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 10 days.

(21) Appl. No.: 15/270,092

(22) Filed: Sep. 20, 2016

(65) Prior Publication Data
US 2017/0085698 A1 Mar. 23, 2017

(30) Foreign Application Priority Data
Sep. 23, 2015 (KR) .......................... 10-2015-0134822

(51) Int. Cl.
H04B 1/38 (2015.01)
H04M 1/725 (2006.01)
H04W 8/00 (2009.01)

(52) U.S. Cl.
CPC ....... *H04M 1/72533* (2013.01); *H04W 8/005* (2013.01); *H04M 1/72558* (2013.01)

(58) Field of Classification Search
None
See application file for complete search history.

(56) References Cited

U.S. PATENT DOCUMENTS

| 9,387,813 | B1* | 7/2016 | Moeller | B60R 11/04 |
| 2012/0172033 | A1* | 7/2012 | Hilton | G01S 19/14 455/423 |
| 2012/0265861 | A1* | 10/2012 | Yang | H04W 12/06 709/220 |
| 2013/0272164 | A1 | 10/2013 | Leonardos et al. | |
| 2014/0187167 | A1 | 7/2014 | Gupta et al. | |
| 2014/0233550 | A1 | 8/2014 | Hansen | |
| 2014/0337950 | A1 | 11/2014 | Yang et al. | |

(Continued)

FOREIGN PATENT DOCUMENTS

| KR | 10-2016-0084782 | 7/2016 |
| WO | 2014/107009 | 7/2014 |

OTHER PUBLICATIONS

Search Report and Written Opinion dated Dec. 14, 2016 in counterpart International Patent Application No. PCT/KR2016/010482.

*Primary Examiner* — Mohammed Rachedine
(74) *Attorney, Agent, or Firm* — Nixon & Vanderhye, P.C.

(57) ABSTRACT

An electronic apparatus that connects an audio device to an access point (AP) via a wireless fidelity (WIFI) network, and the audio device are provided. The electronic apparatus includes a communication interface including communication circuitry configured to receive a probe request, and a controller configured to provide AP connection information corresponding to the AP to the audio device in response to an indicator that indicates a network setup between the audio device and the AP, wherein the indicator is included in the probe request.

17 Claims, 15 Drawing Sheets

(56) References Cited

U.S. PATENT DOCUMENTS

2015/0230161 A1* 8/2015 Park .................. H04W 48/16
　　　　　　　　　　　　　　　　　370/338
2016/0198397 A1　7/2016 Lee et al.

\* cited by examiner

ELECTRONIC APPARATUS, AUDIO DEVICE, AND METHOD THAT IS PERFORMABLE BY THE ELECTRONIC APPARATUS TO SET NETWORK OF THE AUDIO DEVICE

CROSS-REFERENCE TO RELATED PATENT APPLICATION

This application is based on and claims priority under 35 U.S.C. § 119 to Korean Patent Application No. 10-2015-0134822, filed on Sep. 23, 2015, in the Korean Intellectual Property Office, the disclosure of which is incorporated by reference herein in its entirety.

BACKGROUND

1. Field

The present disclosure relates generally to electronic apparatuses and methods which are performable by the electronic apparatuses to set networks of audio devices. For example, the present disclosure relates to an electronic apparatus for connecting an audio device to an access point (AP) in a wireless fidelity (WIFI) network for communication between the audio device and the AP, the audio device, and a method of setting a network of the audio device.

2. Description of Related Art

Wireless fidelity (WIFI) is a technique for supporting IEEE 802.110-based wireless local area network (LAN) connection, inter-device connection, personal area network (PAN)/LAN/wide area network (WAN) configuration, and the like. Because many operating systems (OSs) support WIFI, electronic apparatuses, such as smartphones, mobile phones, personal digital assistants (PDAs), desktop computers, laptop computers, and netbook computers, can use WIFI.

Peripheral devices including game players, printers, and audio devices have also recently supported WIFI. In particular, audio devices using WIFI are attracting much attention because they provide a high-quality audio output and are able to output audio even if far from a main apparatus. However, it may be difficult for a user to set a WIFI network of an audio device based on whether there are a display and a button (including a number key) for network setup. Further, when there are a plurality of audio devices having wireless networks that must be set, a user must repeatedly perform the same process of setting a wireless network.

SUMMARY

According to an aspect of the present disclosure, an electronic apparatus that connects an audio device to an access point (AP) via a wireless fidelity (WIFI) network includes a communication interface comprising communication circuitry configured to receive a probe request; and a controller configured to provide AP connection information corresponding to the AP to the audio device in response to an indicator that indicates a network setup between the audio device and the AP, wherein the indicator is included in the probe request, wherein the audio device is connected to the AP, based on the AP connection information.

The controller may provide a user interface (UI) for receiving an input for setting a network of the audio device, and the communication interface may change a networking mode of the electronic apparatus to an AP mode, in response to the input received via the UI.

The probe request may be received within a predetermined time period after the networking mode is changed to the AP mode.

The controller may provide a probe response including the AP connection information to the audio device.

When a communication connection between the audio device and the electronic apparatus is completed, the controller may encrypt the AP connection information and provide the encrypted AP connection information to the audio device.

The communication interface may receive a feedback message indicating that the communication connection between the audio device and the AP has been completed, and the controller may terminate the AP mode in response to the feedback message.

The indicator may be included in a service set identifier (SSID) field of the probe request.

The AP connection information may include at least one of an SSID to which the AP belongs, a media access control (MAC) address of the AP, a security method, and password information.

According to an aspect of the present disclosure, an audio device that connects to an access point (AP) via a wireless fidelity (WIFI) network includes a controller configured to generate a probe request including an indicator that indicates a network setup between the audio device and the AP; and a communication interface comprising communication circuitry configured to transmit the probe request to an electronic apparatus, to receive AP connection information corresponding to the AP from the electronic apparatus, and to connect to the AP using the AP connection information.

When a communication connection between the audio device and the electronic apparatus is completed, the communication interface may transmit a feedback message to the electronic apparatus.

According to an aspect of the present disclosure, a method of connecting an audio device to an access point (AP) via a wireless fidelity (WIFI) network is performed by an electronic apparatus and includes receiving a probe request; and providing AP connection information corresponding to the AP to the audio device in response to an indicator that indicates a network setup between the audio device and the AP, wherein the indicator is included in the probe request.

According to an aspect of the present disclosure, a method in which an audio device connects to an access point (AP) via a wireless fidelity (WIFI) network includes transmitting to an electronic apparatus a probe request including an indicator that indicates a network setup between the audio device and the AP; receiving AP connection information corresponding to the AP from the electronic apparatus; and connecting to the AP using the AP connection information.

According to an aspect of the present disclosure, a non-transitory computer-readable recording medium has recorded thereon a computer program, which, when executed by a computer, performs the above-described methods.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
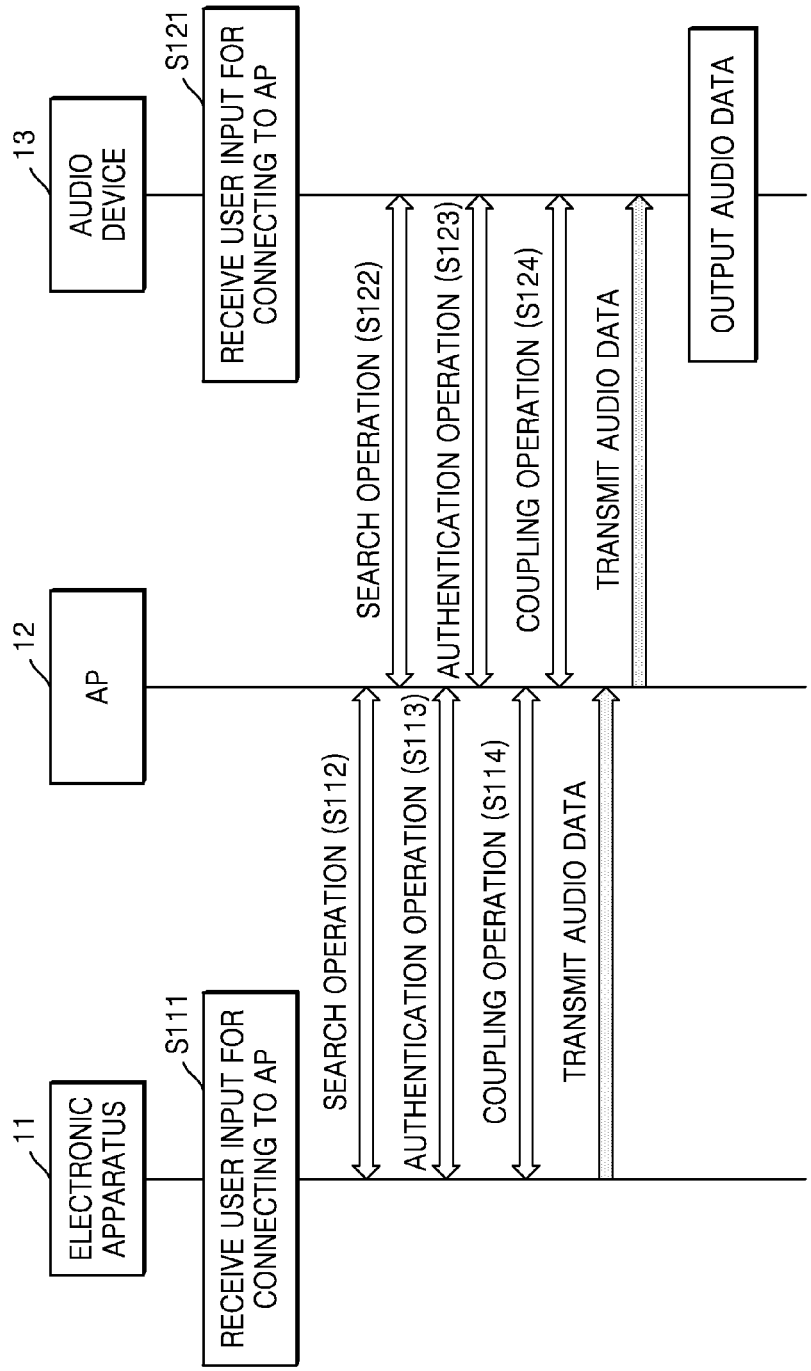
FIG. 1 is a flowchart illustrating an example general method in which an electronic apparatus and an audio device set a wireless fidelity (WIFI) network.

Hereinafter, the terms used in the specification will be briefly described, and then the present disclosure will be described in detail.

Although general terms widely used at present were selected for describing the present disclosure in consideration of the functions thereof, these general terms may vary according to intentions of one of ordinary skill in the art, case precedents, the advent of new technologies, and the like. Terms arbitrarily used in the present disclosure may also be used in a specific case. In this case, their meanings need to be given in the detailed description of the present disclosure. Hence, the terms must be defined based on their meanings and the contents of the entire specification, not by simply stating the terms.

While such terms as "first", "second", etc., may be used to describe various components, such components must not be limited to the above terms. The terms first and second should not be used to attach any order of importance but are used to distinguish one element from another element. For example, a first component discussed below could be termed a second component, and similarly, a second component may be termed a first component without departing from the teachings of this disclosure. The term "and/or" includes any and all combinations of one or more of the associated listed items.

The terms "comprises" and/or "comprising" or "includes" and/or "including" when used in this specification, specify the presence of stated elements, but do not preclude the presence or addition of one or more other elements. Also, the term "unit" in the embodiments of the present disclosure may refer, for example, to a software component or hardware components such as processing circuitry, a field-programmable gate array (FPGA) or an application-specific integrated circuit (ASIC), and performs a specific function. However, the term "unit" is not limited to software or hardware. The term "unit" may be configured to be included in an addressable storage medium or to reproduce one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

When an audio device is turned on, it may refer, for example, to a state in which a power plug of the audio device is inserted into a power source (e.g., a power outlet), power is supplied to the audio device by using a power button.

Embodiments of the present disclosure are described in greater detail herein with reference to the accompanying drawings so that this disclosure may be easily performed by one of ordinary skill in the art to which the present disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 is a sequence diagram or flowchart illustrating an example general method in which an electronic apparatus and an audio device set a wireless fidelity (WIFI) network.

In general, an electronic apparatus 11 and an audio device 13 need to connect to an access point (AP) 12 in order to transmit or receive data to or from each other in an WIFI network environment. WIFI is a wireless local area network (LAN) technique that enables high-performance wireless communication based on the IEEE 802.11x wireless LAN standard. Thus, WIFI enables communication between devices by using a radio wave or infrared transmission method within a certain area where an AP is provided. An AP may connect to a wired LAN cable via which an Internet signal is transmitted, and then may relay data transmission or reception of devices present within a certain area.

Referring to FIG. 1, the electronic apparatus 11 receives an input, e.g., a user input for connecting to the AP 12, in operation S111. For example, the electronic apparatus 11 may receive a user input to a user interface (UI) of starting a WIFI network connection setup. In response to the user input, the electronic apparatus 11 performs a search operation S112.

In the search operation S112, the AP 12 periodically broadcasts a beacon message for clients that try to connect to the AP 12. The beacon message may include several capabilities (speed, encryption, etc.) that may be supported by the AP 12, a service set identifier (SSID), a media access control (MAC) address of the AP 12, and the like. In the search operation S112, in response to the beacon message, the electronic apparatus 11 transmits a probe request including identifier (ID) information of the electronic apparatus 11, a MAC address thereof, a device type thereof, etc., and receives a probe response from the AP 12.

In an authentication operation S113, the electronic apparatus 11 performs an authentication process for verifying that the electronic apparatus 11 is a valid terminal. For example, the electronic apparatus 11 may receive password information for connecting to the AP 12 from a user and may transmit an authentication request including the received password information. When the electronic apparatus 11 is verified as a valid terminal, the electronic apparatus 11 may connect to the AP 12, in a coupling operation S114. The electronic apparatus 11 connected to the AP 12 may transmit data to other devices, such as a server, via the AP 12.

In operation S121, the audio device 13 receives an input, e.g., a user input for connecting to the AP 12. For example, the audio device 13 may receive a user input to a button for turning on the audio device 13 or starting a WIFI network connection setup (or to a UI displayed on a display when the audio device 13 includes the display). Thereafter, the audio device 13 performs a search operation S122, an authentication operation S123, and a coupling operation S124 respectively corresponding to the search operation S112, the authentication operation S113, and the coupling operation S114 performed between the electronic apparatus 11 and the AP 12. At this time, when the AP 12 requests the audio device 13 for password information, the audio device 13 needs to include a character and/or numeric key button, a display, or the like via which the password information may be input by a user. Alternatively, the audio device 13 needs to receive password information or the like from the user via an external device (for example, a remote controller). Accordingly, it may be difficult for a portable audio device or compact audio device including no key buttons and/or no displays to set a WIFI network. Further, a user has to perform a network setup on each of the electronic apparatus 11 and the audio device 13 in order to output a music file of the electronic apparatus 11 via the audio device 13 by using a WIFI network.

To address these problems, according to disclosed embodiments, an electronic apparatus connects an audio device to an AP by using a WIFI network, thereby minimizing manipulations of a user with respect to the audio device. Furthermore, due to the connection of the audio device to the AP by the electronic apparatus via the WIFI network, the audio device including no key buttons and/or no displays may utilize the WIFI network.

Figure 2:
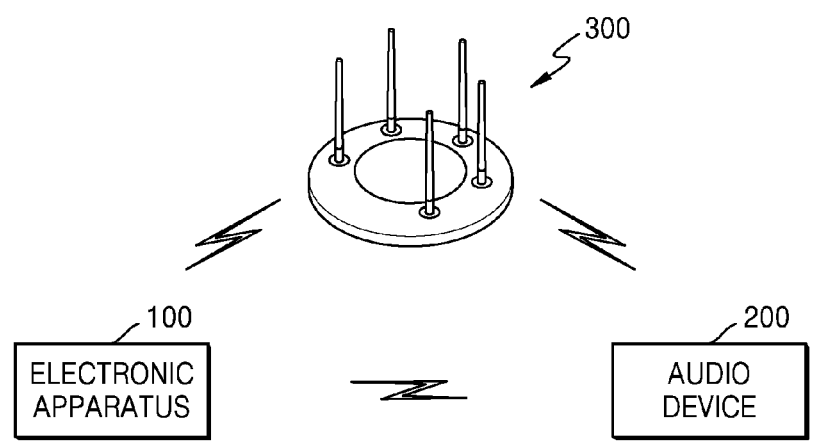
FIG. 2 is a schematic diagram illustrating an example network setup system according to an example embodiment.

FIG. 2 is a schematic diagram illustrating an example network setup system according to an example embodiment.

Referring to FIG. 2, a network setup system using a WIFI network includes an electronic apparatus 100, an audio device 200, and an AP 300.

The electronic apparatus 100 may operate as a client in a WIFI network environment. In other words, the electronic apparatus 100 may connect to the AP 300. The electronic apparatus 100 may also operate as an AP in a WIFI network environment. Accordingly, the audio device 200 may connect to the electronic apparatus 100 and may receive pre-stored AP connection information from the electronic apparatus 100. The AP connection information is used for connecting to the AP 300 via the WIFI network, and may include, for example, an SSID, a MAC address of the AP 300, a security method, and a password.

For example, the electronic apparatus 100 may change a networking mode of the WIFI network from a client mode to an AP mode. The networking mode of the WIFI network may include an AP mode in which the electronic apparatus 100 operates as an AP, and a client mode in which the electronic apparatus 100 operates as a client. When the networking mode is changed to the AP mode, the electronic apparatus 100 may receive, from the audio device 200, a probe request including an indicator that indicates a network setup between the audio device 200 and the AP 300. The indicator may be included in an SSID field of the probe request, and may be, for example, a character, a numeral, or a symbol included in ASCII code or Unicode, or a combination thereof. The indicator may be a pre-arranged value between the electronic apparatus 100 and the audio device 200. In response to the probe request including the indicator, the electronic apparatus 100 may provide the AP connection information to the audio device 200. Thereafter, the electronic apparatus 100 may finish a communication connection with the audio device 200 by ending the AP mode, and may re-connect to the AP 300.

The audio device 200 may connect to the AP 300 by using AP connection information corresponding to the AP 300. Thus, the audio device 200 may transmit or receive data to or from the electronic apparatus 100 via the AP 300.

The electronic apparatus 100 may include, for example, a smartphone, a mobile phone, a navigation device, a TV, a smart TV, a laptop computer, an MP3 player, a moving picture player, a tablet PC, a wearable device, and a camera, but embodiments are not limited thereto. The electronic apparatus 100 may include various apparatuses capable of communicating via a wireless LAN. The audio device 200 may include, for example, a sound bar, a sound bar including a woofer, and one or more portable speakers. The electronic apparatus 100 and the audio device 200 may be located in a space within which they may connect to the AP 300.

Figure 3:
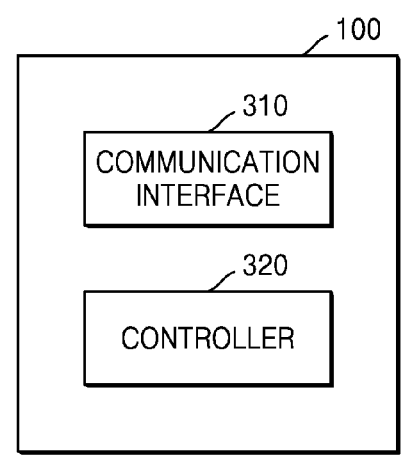
FIG. 3 is a block diagram illustrating an example structure of the electronic apparatus, according to an embodiment.

FIG. 3 is a block diagram illustrating an example structure of the electronic apparatus 100, according to an example embodiment.

Referring to FIG. 3, the electronic apparatus 100 includes a communication interface (e.g., including communication circuitry) 310 and a controller 320.

The communication interface 310 includes one or more components including various communication circuitry that enable the electronic apparatus 100 to transmit or receive data to or from the AP 300 and the audio device 200.

For example, the communication interface 310 may include various communication circuitry, such as, for example, and without limitation, a wireless LAN (not shown). The wireless LAN may support the IEEE802.11x wireless LAN standard of the Institute of Electrical and Electronics Engineers (IEEE). Accordingly, the wireless LAN may transmit or receive data according to the wireless LAN standard under the control of the controller 320.

The controller 320 includes, for example, processing circuitry configured to control all operations of the electronic apparatus 100. For example, the controller 320 may control the communication interface 310 in a WIFI network environment, based on a networking mode that is supported by the electronic apparatus 100. The networking mode may include a client mode in which the electronic apparatus 100 operates as a client that connects to an AP, and an AP mode in which the electronic apparatus 100 operates as the AP.

The controller 320 may control the communication interface 310 to connect to the AP 300, in the client mode. For example, the controller 320 may acquire a beacon message broadcast by the AP 300, via the communication interface 310. The controller 320 may connect to the AP 300 by using the beacon message. Alternatively, the controller 320 may search for an accessible AP by broadcasting a probe request having an SSID field which is null, via the communication interface 310. A process in which the controller 320 performs a communication connection with the AP 320 corresponds to a general communication connection process of FIG. 1, and thus a detailed description thereof is omitted.

When the communication connection of the controller 320 with the AP 300 is completed, the controller 320 may store the AP connection information of the AP 300 in a storage (not shown). The AP connection information is used to connect to the AP 300 via a WIFI network, and may include, for example, an SSID to which the AP 300 belongs, a MAC address of the AP 300, a security method, and password information.

The controller 320 may change the networking mode. For example, the controller 320 may change the networking mode in response to a user input. In detail, the controller 320 may provide a UI for receiving a user input of setting a network of an external audio device by using a WIFI network. In response to a user input through the UI, the controller 320 may change the networking mode to the AP mode.

When the networking mode is changed to the AP mode, the communication interface 310 may receive a probe request from an external device. In detail, the controller 320 may control the communication interface 310 to receive probe requests from external devices during a certain time period after the networking mode is changed to the AP mode.

Alternatively, when the networking mode is changed to the AP mode, the controller 320 may generate an SSID that is distinguished from an SSID to which the AP 300 belongs, and may broadcast a beacon message including the generated SSID via the communication interface 310. In this case, the controller 320 may control the communication interface 310 to receive probe requests from external devices during a certain time period after the beacon message is broadcast.

During the certain time period while the probe requests are received, the controller 320 may provide an icon, a progress bar image, or the like for informing a user that an audio device is being searched for, to the screen of the electronic apparatus 100.

The communication interface 310 may receive a probe request from the audio device 200. The controller 320 may determine whether the probe request received via the communication interface 310 includes an indicator that indicates a WIFI network setup between the audio device 200 and the AP 300. For example, the controller 320 may extract the SSID field of the probe request and may determine whether the extracted SSID field includes the indicator. The indicator may be, for example, a character, a numeral, or a symbol included in ASCII code or Unicode, or a combination thereof.

When the SSID field of the probe request includes an indicator, the controller 320 may provide pre-stored AP connection information to the audio device 200. In detail, the controller 320 may include the AP connection information in a user definition field of a probe response that is to be transmitted in response to the probe request. For example, the controller 320 may add an SSID to which the AP 300 belongs, a MAC address of the AP 300, a security method, and password information to the user definition field of the probe response.

Alternatively, the controller 320 may include only information indicating that the AP connection information is scheduled to be transmitted, in the user definition field of the probe response. For example, the controller 320 may add a specific bit (for example, 0xFF00) to the user definition field of the probe response. In this case, after the controller 320 completes a WIFI communication connection between the electronic apparatus 100 and the audio device 200, the controller 320 may transmit the AP connection information to the communication-connected audio device 200. For example, the electronic apparatus 100 and the audio device 200 may perform the authentication process and the coupling process of FIG. 1. During the coupling process, the electronic apparatus 100 may not request password information. After the communication connection is completed, the controller 320 may encrypt the AP connection information. For example, the controller 320 may encrypt the AP connection information via an encryption method transmitted to or received from the audio device 200 during the communication connection. Alternatively, the controller 320 may encrypt the AP connection information by using a specific algorithm. The controller 320 may transmit the encrypted AP connection information to the audio device 200 via the communication interface 310.

According to an embodiment, the electronic apparatus 100 may receive probe requests including an indicator from a plurality of audio devices. In this case, the controller 320 may provide an audio device list including ID information of the plurality of audio devices (for example, the names and icons of the audio devices) to the screen of the electronic apparatus 100. In response to a user input of selecting an audio device from the audio device list, the controller 320 may provide the AP connection information to the selected audio device. The provision of the audio device list to the screen of the electronic apparatus 100 by the controller 320 will be described later with reference to FIGS. 7 and 8.

The communication interface 310 may receive a feedback message indicating that a communication connection between the audio device 200 and the AP 300 has been completed, by using the AP connection information. In response to the feedback message, the controller 320 may terminate the AP mode. Accordingly, the communication interface 310 may re-connect to the AP 300.

According to an embodiment, the controller 320 may provide a screen image representing that the audio device 200 has been connected to the WIFI network.

Thereafter, the communication interface 310 may transmit audio data (for example, a music file, a voice, and an audio stream) and/or video data (for example, a moving picture file, a still image, and a moving picture stream) to the audio device 200 via the AP 300, under the control of the controller 320.

As such, the electronic apparatus 100 according to an embodiment may search for an external audio device by using a WIFI network and provide AP connection information for connecting to an AP to a found audio device, in response to a user input of setting a network of the external audio device. Accordingly, the found audio device may not request for a special user input in order to connect to the AP.

Although it has been described above that a connection between the electronic apparatus 100 and the AP 300 is first terminated and is then resumed as the networking mode of the electronic apparatus 100 is changed, embodiments are not limited thereto. According to an embodiment, when the communication interface 310 includes a plurality of wireless LANs or when a wireless LAN may operate in a plurality of modes, the controller 320 may maintain the communication connection with the AP 300.

Figure 4:
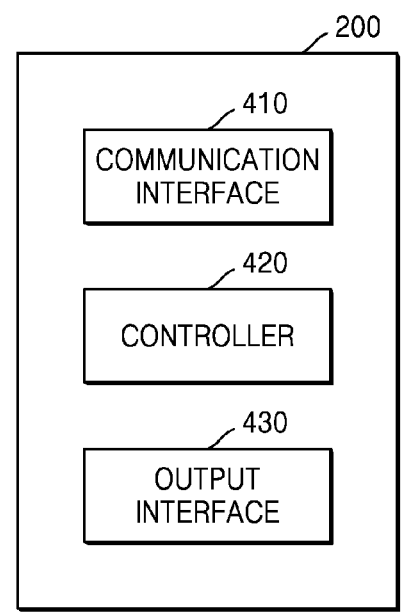
FIG. 4 is a block diagram illustrating an example structure of the audio device, according to an example embodiment.

FIG. 4 is a block diagram illustrating an example structure of the audio device 200, according to an example embodiment.

Referring to FIG. 4, the audio device 200 includes a communication interface (e.g., including communication circuitry) 410, a controller 420, and an output interface (e.g., including output circuitry) 430.

The communication interface 410 includes one or more components including various communication circuitry that enable the audio device 200 to transmit or receive data to or from the AP 300 and the electronic apparatus 100. For example, the communication interface 410 may include various communication circuitry, such as, for example, and without limitation, a wireless LAN (not shown). The wireless LAN may support the IEEE802.11x wireless LAN standard of the Institute of Electrical and Electronics Engineers (IEEE). Accordingly, the wireless LAN may transmit or receive data according to the wireless LAN standard under the control of the controller 420.

The controller 420 may include processing circuitry configured to control all operations of the audio device 200.

When the audio device 200 is turned on, the controller 420 may generate a probe request including an indicator that indicates a network setup with the AP 300. The indicator may be included in an SSID field of the probe request, and may be, for example, a character, a numeral, or a symbol included in ASCII code or Unicode, or a combination thereof.

Alternatively, the controller 420 may generate a probe request including the indicator indicating a network setup with the AP 300, in response to a user input of a network setup button (e.g., a physical button, or a soft button when a display is included) included in the audio device 200.

The communication interface 410 may periodically transmit the generated probe request to the outside.

Alternatively, when a beacon message that is broadcast by the electronic apparatus 100 is acquired via the communication interface 410, the controller 420 may generate a probe request indicating the indicator indicating a network setup with the AP 300, based on the beacon message. In this case, the communication interface 410 may transmit the probe request to the electronic apparatus 100 by using the beacon message.

The communication interface 410 may receive AP connection information for connecting to the AP 300, from the electronic apparatus 100. The AP connection information is used to connect to the AP 300 via a WIFI network, and may include, for example, an SSID to which the AP 300 belongs, a MAC address of the AP 300, a security method, and password information.

For example, the controller 420 may acquire AP connection information included in a user definition field of a probe response that is transmitted by the electronic apparatus 100 in response to the probe request. Alternatively, the controller 420 may acquire the AP connection information after a communication connection with the electronic apparatus 100 is completed. In this case, information (for example, a specific bit '0xFF00') indicating that the AP connection information is scheduled to be transmitted may be included in the user definition field of the probe response that is received from the electronic apparatus 100.

The controller 420 may connect to the AP 300 by using the received AP connection information. Because the AP connection information includes a security method for connecting to the AP 300, password information, and the like, the audio device 200 may omit an operation of receiving a password for connecting to the AP 300 from a user.

When the communication connection with the AP 300 is completed, the communication interface 410 may transmit, to the electronic apparatus 100, a feedback message indicating that the communication connection between the audio device 200 and the AP 300 has been completed, under the control of the controller 420. Thereafter, the communication interface 410 may receive audio data (for example, a voice, a music file, a sound, or an audio stream) and/or video data (for example, a moving picture file, a still image, or a moving picture stream) from the electronic apparatus 100 via the AP 300.

The output interface 430 outputs the received audio and/or video data under the control of the controller 420. For example, the output interface 430 may output the audio data received via the communication interface 410. The output interface 430 may be implemented using a 1-channel, 2-channel, or 2.1-channel speaker (not shown).

Figure 5A:
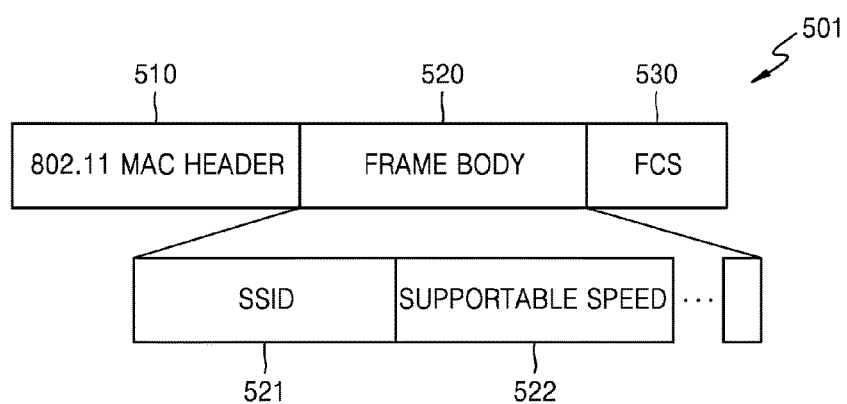
FIGS. 5A and 5B illustrate example probe requests.
Figure 5B:
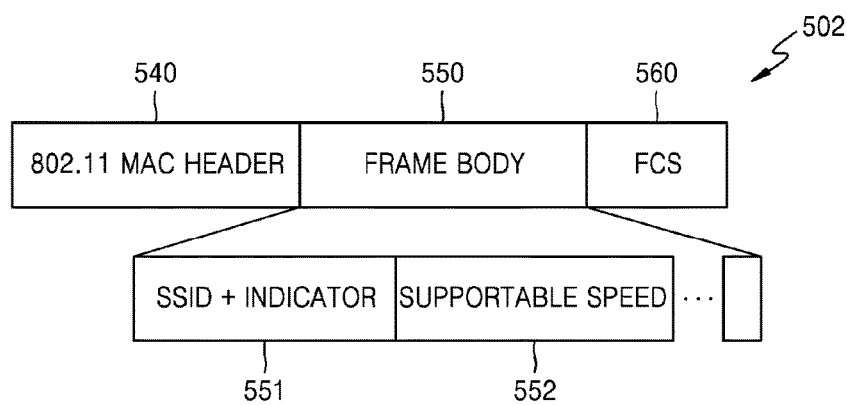

FIGS. 5A and 5B illustrate example probe requests.

FIG. 5A illustrates a general probe request 501. As illustrated in FIG. 5, the general probe request 501 includes an 802.11 MAC header field 510, a frame body field 520, and a frame check sequence (FCS) field 530. The 802.11 MAC header field 510 includes sub-fields indicating information about a protocol version according to the IEEE 802.11x wireless LAN standard, and information about the type of data that is transmitted. The frame body field 520 may include an SSID sub-field 521, and a sub-field 522 indicating supportable speed information. The SSID sub-field 521 may include an SSID of a particular service set to which a transmission device that transmits the general probe request 501 desires to connect. Alternatively, the SSID sub-field 521 may include a null value for searching for a service set to which the transmission device may connect.

FIG. 5B illustrates a probe request 502 that is transmitted by the audio device 200, according to an embodiment. The probe request 502 that is transmitted by the audio device 200 includes an 802.11 MAC header field 540, a frame body field 550, and an FCS field 560, similar to FIG. 5A. However, an SSID sub-field 551 of the probe request 502 that is transmitted by the audio device 200 may further include an indicator that indicates a network setup between the audio device 200 and the AP 300. The indicator may be, for example, a character, a numeral, or a symbol included in ASCII code or Unicode, or a combination thereof.

In detail, the indicator may be an affix, suffix, or prefix added to the SSID. Table 1 below shows an example of values that are obtained by combining an SSID with indicators and are stored in the SSID sub-field 551.

TABLE 1

| SSID | Indicator | Value stored in SSID sub-field 551 |
|---|---|---|
| [Samsung]Soundbar | * | [Samsung]Soundbar* |
| [Samsung]Soundbar | ^ | [Samsung]Soundbar^ |
| [Samsung]Soundbar | _ | [Samsung]Soundbar_ |
| [Samsung]Soundbar | (space) | [Samsung]Soundbar |

The SSID values included in the SSID sub-field 551 may be arbitrarily generated by the electronic apparatus 100. For example, the controller 420 of the audio device 200 may store, in the SSID sub-field 551, a value obtained by combining SSID information included in the beacon message received from the electronic apparatus 100 with indicators.

Alternatively, the SSID values included in the SSID sub-field 551 may be name information of the audio device 200. For example, when the controller 420 of the audio device 200 receives no beacon messages from the electronic apparatus 100, the controller 420 may store, in the SSID sub-field 551, values obtained by combining the name information of the audio device 200 with indicators.

Figure 6A:
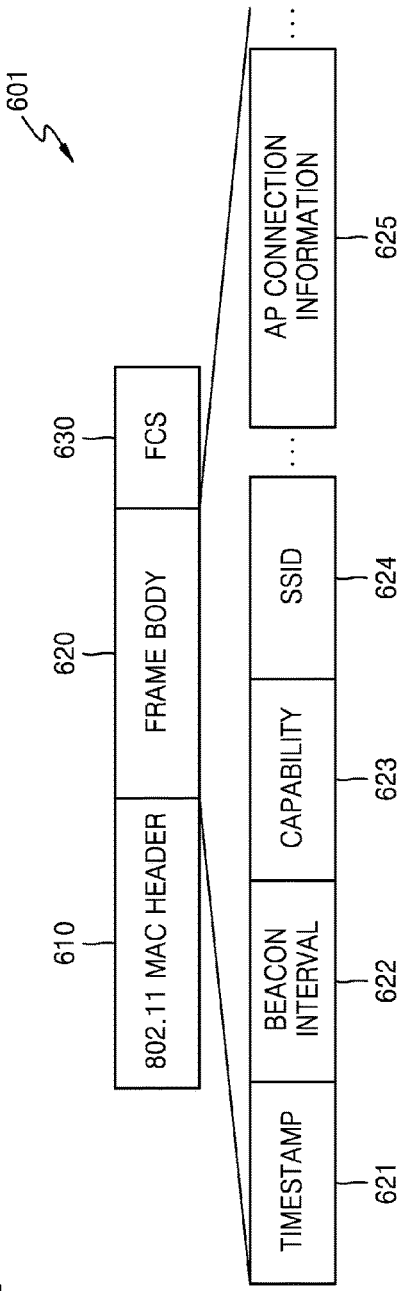
FIGS. 6A and 6B illustrate examples of a probe response that the electronic apparatus transmits to the audio device.
Figure 6B:
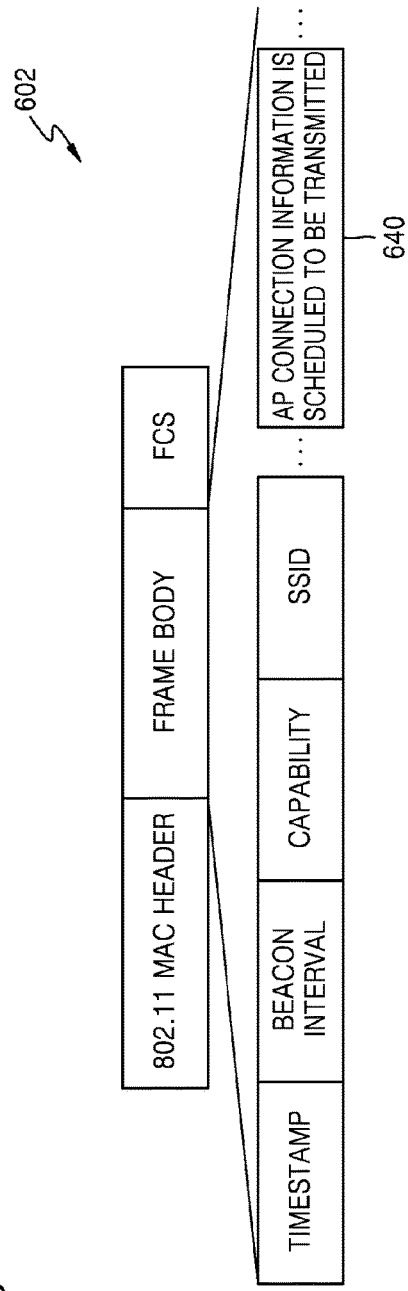

FIGS. 6A and 6B illustrate examples of a probe response that the electronic apparatus 100 transmits to the audio device 200.

Referring to FIGS. 6A and 6B, when a probe request includes an indicator that indicates a network setup between the audio device 200 and the AP 300, the controller 320 of the electronic apparatus 100 may transmit a probe response 601 or 602 to the audio device 200.

Referring to FIG. 6A, the probe response 601 includes an 802.11 MAC header field 610, a frame body field 620, and an FCS field 630. The 802.11 MAC header field 610 includes sub-fields including information about a protocol version according to the IEEE 802.11x wireless LAN standard, and information about the type of data that is transmitted. The frame body field 620 may include a timestamp sub-field 621, a beacon interval sub-field 622, a capability sub-field 623, an SSID sub-field 624, a user definition field 625, etc. The SSID sub-field 624 may include the SSID generated by the electronic apparatus 100 or name information of the audio device 200. The user definition field 625 may include AP connection information. For example, the user definition field 625 may include an SSID to which the AP 300 belongs, a MAC address of the AP 300, a security method, and password information.

In response to the probe response 601, the controller 420 of the audio device 200 may connect to the AP 300 by using the AP connection information included in the probe response 601.

Alternatively, as in FIG. 6B, a user definition field 640 of the probe response 602 may include only information indicating that the AP connection information is scheduled to be transmitted. In this case, after a WIFI communication connection between the electronic apparatus 100 and the audio device 200 is completed, the controller 320 of the electronic apparatus 100 may transmit AP connection information to the audio device 200. Accordingly, the controller 420 of the audio device 200 may connect to the AP 300 by using the received AP connection information.

Figure 7:
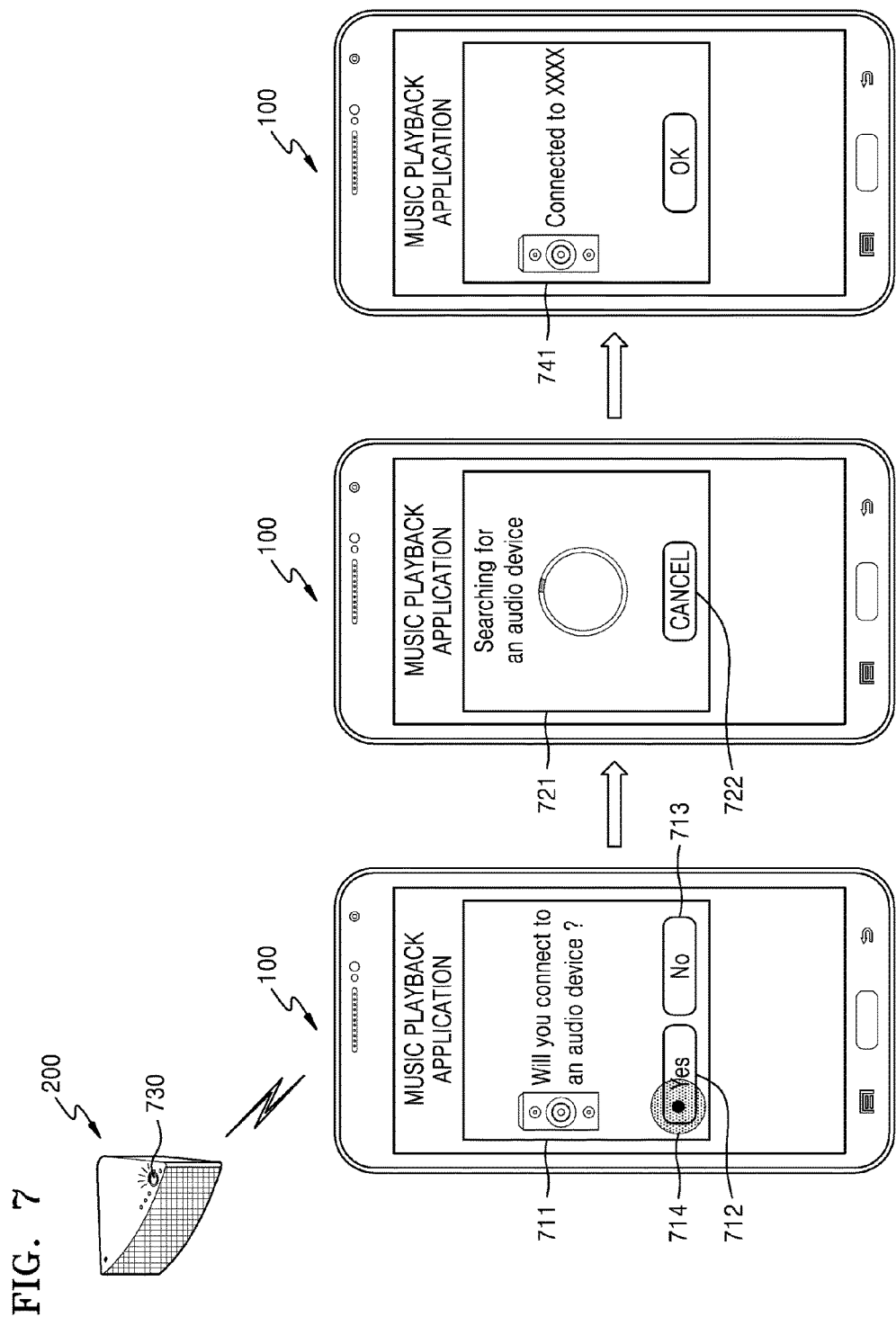
FIGS. 7 and 8 are diagrams illustrating examples of screen images of the electronic apparatus that are provided to a user of the electronic apparatus while the electronic apparatus is setting a network of the audio device, according to an example embodiment.
Figure 8:
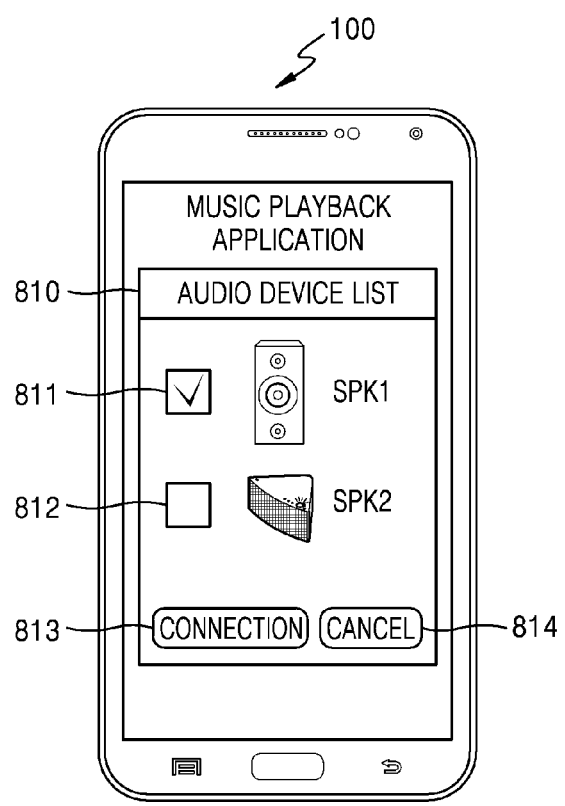

FIGS. 7 and 8 illustrate examples of screen images of the electronic apparatus 100 that are provided to a user of the electronic apparatus 100 while the electronic apparatus 100 is setting a network of the audio device 200, according to an example embodiment.

Referring to FIG. 7, the electronic apparatus 100 may be a smartphone. The controller 320 of the electronic apparatus 100 may provide a UI for setting a network of an external audio device by using a WIFI network.

For example, the controller 320 of the electronic apparatus 100 may provide a first screen image 711 including a "Yes" button image 712 and a "No" button image 713 together with a text "Will you connect to an audio device?". In response to a user input 714 with respect to the "YES" button image 712, the controller 320 of the electronic apparatus 100 may change the networking mode of the electronic apparatus 100 to an AP mode. Accordingly, the communication interface 310 of the electronic apparatus 100 may receive a probe request from the external audio device for a certain time period.

During the certain time period while the communication interface 310 is receiving the probe request, the controller 320 of the electronic apparatus 100 may provide a screen image representing that the electronic apparatus 100 is searching for an external audio device. The controller 320 of the electronic apparatus 100 may provide a second screen image 721 including a circular progress bar image together with a text "searching for an audio device". The controller 320 of the electronic apparatus 100 may provide a "CANCEL" button image 722 to the second screen image 721 so that a user may stop an audio device searching operation of the electronic apparatus 100. In detail, in response to a user input to the "CANCEL" button image 722, the controller 320 of the electronic apparatus 100 may no longer receive the probe request by terminating the AP mode.

When the audio device 200 is turned on according to a user input of depressing a power button 730 of the audio device 200 or a power-on signal is received from a remote controller (not shown) linked with the audio device 200, the controller 420 of the audio device 200 may supply power to the components of the audio device 200. When the audio device 200 is turned on, the controller 420 of the audio device 200 may control the communication interface 410 to transmit a probe request including an indicator that indicates a network setup between the audio device 200 and the AP 300 at regular intervals to the electronic apparatus 100.

When the probe request received from the audio device 200 includes an indicator, the controller 320 of the electronic apparatus 100 may provide AP connection information for connecting to the AP 300 to the audio device 200.

When a feedback message representing that a communication connection between the audio device 200 and the AP 300 has been completed is received from the audio device 200, the controller 320 of the electronic apparatus 100 may terminate the AP mode and may provide a screen image representing that the audio device 200 has been connected to the AP 300 for communication with the AP 300. For example, the controller 320 of the electronic apparatus 100 may provide a third screen image 741 including a text "connected to XXXX".

According to an embodiment, the communication interface 310 of the electronic apparatus 100 may receive probe requests including indicators from a plurality of audio devices. In this case, the electronic apparatus 100 may transmit AP connection information to the plurality of audio devices and may provide a screen image representing that the electronic apparatus 100 has been connected to the plurality of audio devices via the WIFI network.

Alternatively, as illustrated in FIG. 8, the controller 320 of the electronic apparatus 100 may provide an audio device list including ID information of the plurality of audio devices, before transmitting AP connection information to the plurality of audio devices. For example, the controller 320 of the electronic apparatus 100 may provide a fourth screen image 810 including the audio device list and check box UIs 811 and 812 capable of selecting an audio device from the audio device list. The fourth screen image 810 including the audio device list may provide a "CONNECTION" button image 813 for transmitting the AP connection information to selected audio devices, and a "CANCEL" button image 814 for stopping network setup operations of the audio devices. In response to a user input to the "CONNECTION" button image 813, the controller 320 of the electronic apparatus 100 may provide the AP connection information to the selected audio devices. However, in response to a user input to the "CANCEL" button image 814, the controller 320 of the electronic apparatus 100 terminates the AP mode.

Figure 9:
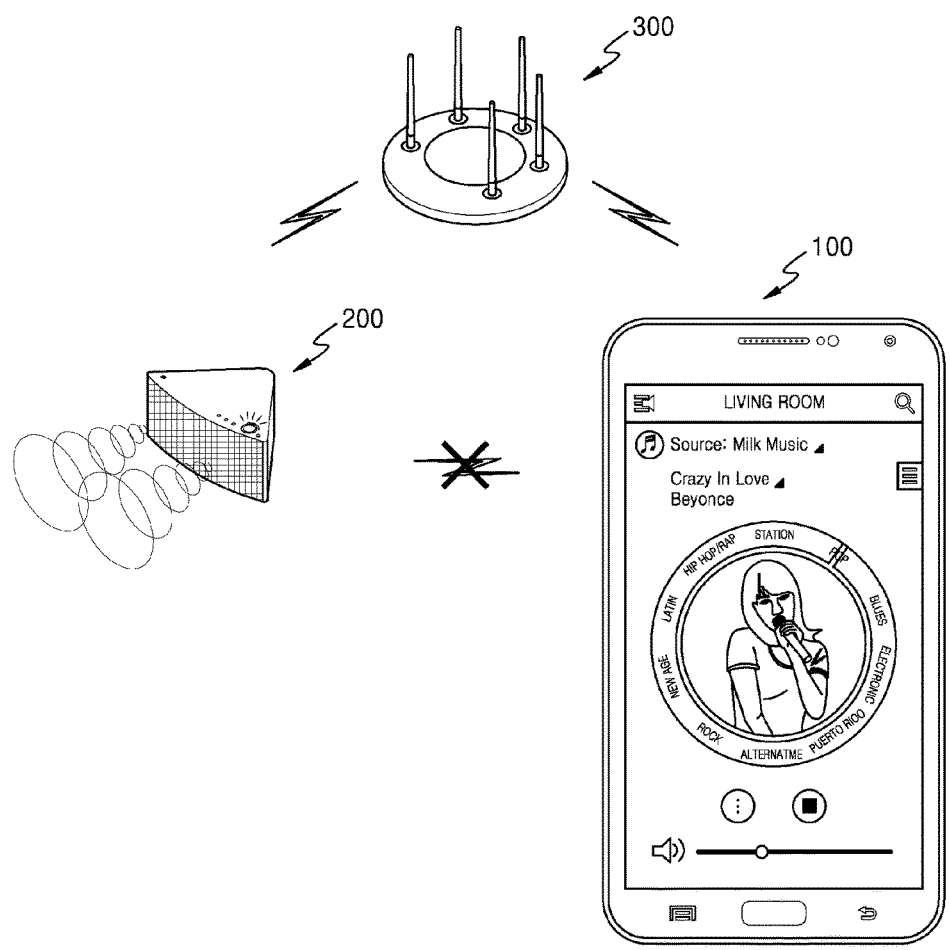
FIG. 9 is a diagram illustrating an example in which the electronic apparatus provides audio data to the audio device.

FIG. 9 is a diagram illustrating an example in which the electronic apparatus 100 provides audio data to the audio device 200.

Referring to FIG. 9, the electronic apparatus 100 may transmit audio data to the audio device 200 with which a network setup has been completed, via the AP 300. For example, the controller 320 of the electronic apparatus 100 may provide a music file to the audio device 200 via the AP 300, in response a user input of playing back music. The audio device 200 may output the music file received via the AP 300.

Figure 10:
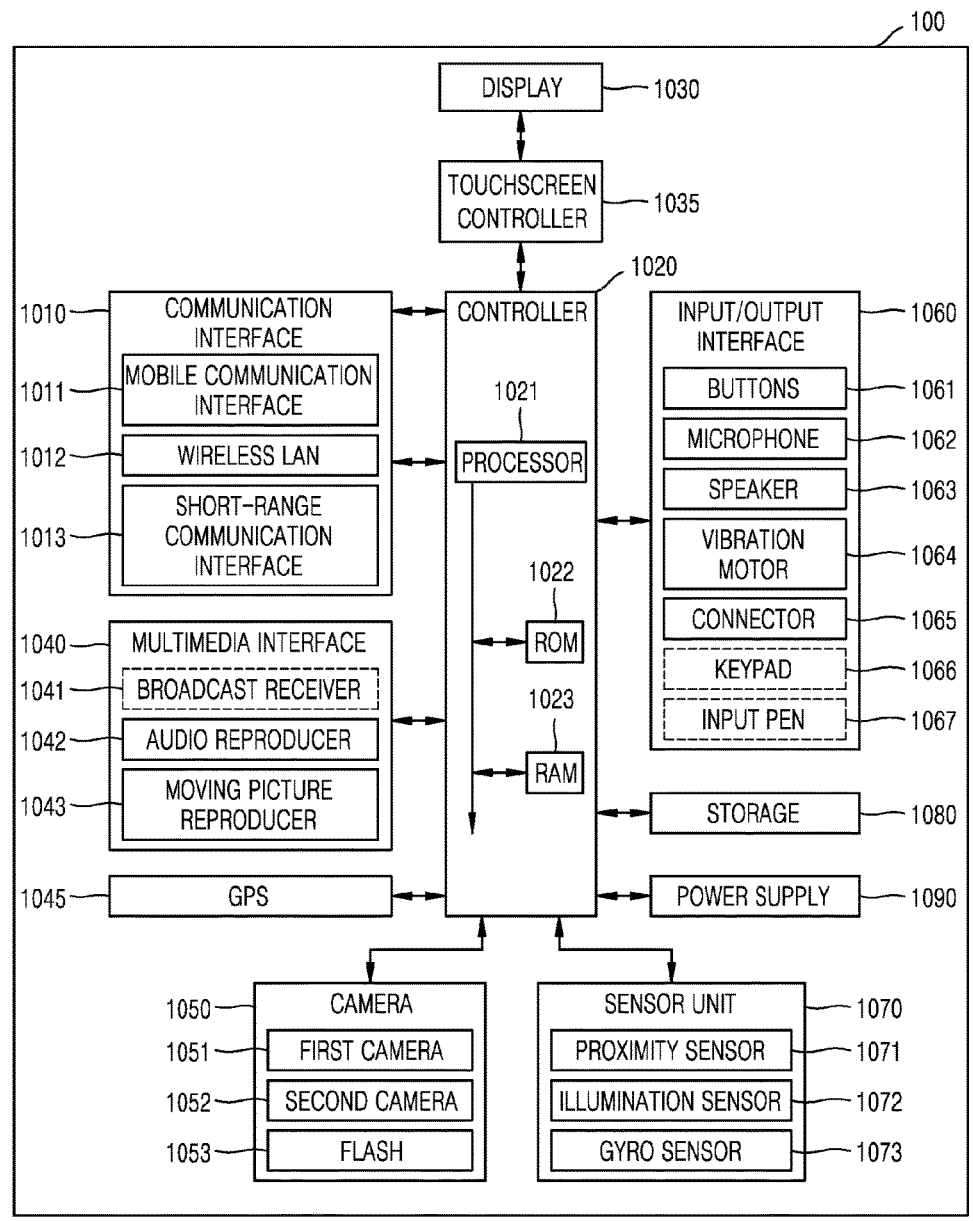
FIG. 10 is a block diagram illustrating an example structure of the electronic apparatus, according to an example embodiment.

FIG. 10 is a block diagram illustrating a detailed structure of the electronic apparatus 100, according to an embodiment.

Referring to FIG. 10, the electronic apparatus 100 may include a display 1030, a multimedia interface 1040, a global positioning system (GPS) unit 1045, a camera 1050, an input/output interface (e.g., including input/output circuitry) 1060, a sensor unit 1070, a storage 1080, and a power supply 1090, in addition to a communication interface (e.g., including communication circuitry) 1010 and a controller 1020 respectively corresponding to the communication interface 310 and the controller 320 of FIG. 3.

The communication interface 1010 includes one or more components including various communication circuitry capable of transmitting or receiving data to or from external devices, such as the audio device 200 and the AP 300. For example, the communication interface 1010 may include a mobile communication interface 1011, a wireless LAN 1012, and a short-range communication interface 1013.

The mobile communication interface 1011 may be connected to the outside via a mobile communication network using one or more antennas under the control of the controller 1020. The mobile communication interface 1011 may transmit/receive a wireless signal for any of a voice call, a video call, a short message service (SMS), a multimedia message service (MMS), or data communication to/from any of a mobile phone (not shown) having an available phone number, a smartphone (not shown), a tablet PC, or another electronic apparatus (not shown).

The wireless LAN 1012 may be wirelessly connected to the AP 300 in a location at which the AP 300 is provided under the control of the controller 1020. Alternatively, the wireless LAN 1012 may enable other electronic apparatuses to connect to the electronic apparatus 100 under the control of the controller 1020. The wireless LAN 1012 supports the IEEE802.11x wireless LAN standard of the IEEE.

The short-range communication interface 1013 may include, but is not limited to Bluetooth, Bluetooth low energy (BLE), infrared data association (IrDA), ultra wideband (UWB), and near field communication (NFC).

The communication interface 1010 corresponds to the communication interface 310 of FIG. 3, and thus a detailed description thereof will be omitted.

The electronic apparatus 100 may include at least one of the mobile communication interface 1011, the wireless LAN 1012, and the short-range communication interface 1013 in accordance with the performance of the electronic apparatus 100. For example, the electronic apparatus 100 may include one of the mobile communication interface 1011, the wireless LAN 1012, and the short-range communication interface 1013, or a combination of the mobile communication interface 1011, the wireless LAN 1012, and the short-range communication interface 1013.

The controller 1020 may include a processor 1021, read-only memory (ROM) 1022 in which a control program for controlling the electronic apparatus 100 is stored, and random-access memory (RAM) 1023 in which a signal or data that is received from the outside of the electronic apparatus 100 is stored or data for various operations performed by the electronic apparatus 100 is stored. The processor 1021, the ROM 1022, and the RAM 1023 may be implemented using semiconductor chips.

The controller 1020 controls an overall operation of the electronic apparatus 100 and the flow of signals between the elements 1010 through 1090 included in the electronic apparatus 100, and processes data. The controller 1020 controls the power supply 1090 to supply power to the elements 1010 through 1090. Further, when the user's input or set conditions are satisfied, the controller 1020 may execute an individual sensor of the sensor unit 1070, or an OS or an application that is stored in the storage 1080.

The processor 1021 may include a graphics processing unit (GPU) (not shown) for graphic processing. The processor 1021 may be implemented as a system-on-chip (SoC) including a core (not shown) and a GPU (not shown). The processor 1021 may include a single core, a dual core, a triple core, a quad core, or a multiple core thereof. Further, the processor 1021, the ROM 1022, and the RAM 1023 may be connected to one another via a bus.

The controller 1020 may control the communication interface 1010, the display 1030, a touch screen controller 1035, the multimedia interface 1040, the GPS unit 1045, the camera 1050, the input/output interface 1060, the sensor unit 1070, the storage 1080, and the power supply 1090.

The controller 1020 may change the networking mode of a WIFI network to an AP mode and determine whether probe requests received from external devices include indicators that indicate network setups between the external devices and an AP. When the probe requests received from the external devices include indicators, the controller 1020 may provide AP connection information including an SSID to which the AP 300 belongs, password information, and the like to the external devices. The controller 1020 corresponds to the controller 320 of FIG. 3, and thus a detailed description thereof will be omitted.

The display 1030 displays information that is processed by the controller 1020. According to an embodiment, the display 1030 may display a UI of receiving a user input for setting a network of an audio device via WIFI. The display 1030 may also display information representing that an audio device is being searched for, while the electronic apparatus 100 is receiving the probe requests from the external devices. The display 1030 may also display information representing that a found audio device has been connected to an AP via the WIFI network. When the display 1030 receives from a plurality of audio devices probe requests including indicators indicating network setups between the audio devices and an AP, the display 1030 may display an audio device list including ID information of the plurality of audio devices.

The display 1030 may include a touch panel (not shown) that receives a touch input, and a display panel (not shown) that displays an image. The touch panel may transmit, to the touch screen controller 1035, an analog signal that corresponds to a single touch or a multi-touch that is input via the display 1030. The touch panel may receive the single touch or the multi-touch via the user's body part (e.g., a finger such as the thumb) or an input pen 1067.

The display panel includes a plurality of pixels and displays an image via the pixels. Examples of the display panel include a liquid crystal display (LCD), an organic light-emitting diode (OLED) display, and an LED. The display panel may display various images and a plurality of objects in accordance with various operation states of the electronic apparatus 100 or execution of an application or service.

Examples of a touch, according to an embodiment, are not limited to contact between the touch panel and the user's body part or the input pen 1067, and also include non-contact. Examples of non-contact may include hovering with an interval of 50 mm or less between the display 1030 and the user's body part or the input pen 1067.

The display 1030 may use a resistive method, a capacitive method, an infrared method, or an acoustic wave method.

Alternatively, the display 1030 may use an electromagnetic resonance (EMR) method. An EMR touch screen may further include a separate EMR touch panel (not shown) which is configured to receive an input of an input pen (not shown) and which includes a resonance circuit that resonates using an EMR loop coil.

The controller 1020 may control the display 1030 by using a digital signal received from the touch screen controller 1035.

The electronic apparatus 100 may include a plurality of displays. The displays may be respectively located in housings (not shown) and the housings may be connected to one another by using hinges (not shown). Alternatively, a plurality of flexible displays may be located in one housing.

The multimedia interface 1040 may include a broadcast receiver 1041, an audio reproducer 1042, and/or a moving picture reproducer 1043. The broadcast receiver 1041 may receive, in response to a control by the controller 1020, a broadcast signal (e.g., a television (TV) broadcast signal, a radio broadcast signal, or a data broadcast signal) that are transmitted from an external broadcasting station via a broadcasting antenna (not shown) and additional broadcast information (e.g., an electric program guide (EPG) or an electric service guide (ESG)). Further, the controller 1020 may reproduce the received broadcast signal and the received broadcast additional information by using a touch screen, a video coder/decoder ("codec") (not shown), and an audio codec (not shown).

The audio reproducer 1042 may reproduce an audio source (e.g., an audio file having a file extension mp3, wma, ogg, or way) that has previously been stored in the storage 1080 of the electronic apparatus 100 or is received from the outside, by using an audio codec under the control of the controller 1020.

The moving picture reproducer 1043 may reproduce a digital video source (e.g., a video file having a file extension mpeg, mpg, mp4, avi, mov, or mkv) that has previously been stored in the storage 1080 of the electronic apparatus 100 or is received from the outside, by using a video codec under the control of the controller 1020. A multimedia application that may be installed in the electronic apparatus 100 may reproduce an audio source or a video source by using an audio codec and/or a video codec. Alternatively, a multimedia application that may be installed in the electronic apparatus 100 may reproduce a video source by using a hardware codec (not shown) and/or a software codec (not shown).

The multimedia interface 1040 may include the audio reproducer 1042 and the moving picture reproducer 1043 without the broadcast receiver 141, according to the performance or the structure of the electronic apparatus 100. Alternatively, the controller 1020 may include the audio reproducer 1042 or the moving picture reproducer 1043 of the multimedia interface 1040.

The term "audio codec" as used herein may include one or more audio codecs. The term "video codec" as used herein may include one or more video codecs.

The camera 1050 may include at least one of a first camera 1051 that is a front camera and a second camera 1052 that is a rear camera in order to capture a still image and/or a moving image under the control of the controller 1020. For example, the camera 1050 may include one of the first camera 1051 and the second camera 1052, or both the first camera 1051 and the second camera 1052. The first camera 1051 or the second camera 1052 may include an auxiliary light source (e.g., a flash 1053) that provides an amount of light which is sufficient to capture an image.

The controller 1020 may capture a 3D still image or moving image by using the first camera 1051 that is a front camera and an additional camera (e.g., a third camera (not shown)) that is disposed adjacent to the first camera 1051 (e.g., spaced by an interval that is, for example, greater than 30 mm and less than 80 mm, from the first camera 1051). Alternatively, the controller 1020 may capture a 3D still image or a 3D moving image by using the second camera 1052 that is a rear camera and an additional camera (e.g., a fourth camera (not shown)) that is disposed adjacent to the second camera 1052 (e.g., spaced by an interval that is, for example, greater than 30 mm and less than 80 mm, from the second camera 1052). Further, the first and second cameras 1051 and 1052 may perform any of wide-angle photographing, telephotographing, and macro photographing by using an additional lens (not shown) that is attachable/detachable to/from a separate adaptor (not shown).

The GPS unit 1045 periodically receives, from any of a plurality of GPS satellites (not shown), signals (e.g., orbit information of the GPS satellites, time information that relates to the GPS satellites, and navigation messages).

The electronic apparatus 100 may calculate respective locations of the plurality of GPS satellites and the electronic apparatus 100 by using the signals received from the plurality of GPS satellites, and may calculate distances by using transmission/reception time differences. A location, a time, or a movement speed of the electronic apparatus 100 may be calculated by using triangulation. Input from an additional GPS satellite (not shown) may be required in order to correct an orbit or a time.

The electronic apparatus 100 may detect a location or a movement speed of the electronic apparatus 100 that is located indoors by using the AP 300. The electronic apparatus 100 may detect a location of the electronic apparatus 100 that is located indoors, by using a cell-ID method that uses an identifier (ID) of the AP 300, an enhanced cell-ID method that uses the ID of the AP 300 and a received signal strength (RSS), or an angle of arrival (AoA) method that uses an angle at which a signal transmitted from the AP 300 is received by the electronic apparatus 100. Alternatively, the electronic apparatus 100 may detect a location or a movement speed of the electronic apparatus 100 that is located indoors, by using a beacon message. It will be understood by one of ordinary skill in the art that a location of the electronic apparatus 100 that is located indoors may be detected by using any of various other methods.

The input/output interface 1060 may include at least one of one or more buttons 1061, a microphone 1062, a speaker 1063, a vibration motor 1064, a connector 1065, a keypad 1066, and the input pen 1067. Functions of the elements included in the input/output interface 1060 would be instinctively understood by one of ordinary skill in the art in view of their names, and thus detailed descriptions thereof will be omitted.

The sensor unit 1070 includes at least one sensor that detects a state of the electronic apparatus 100. For example, the sensor unit 1070 may include a proximity sensor 1071 that detects whether the user approaches the electronic apparatus 100, an illumination sensor 1072 that detects an amount of light around the electronic apparatus 100, and a gyro sensor 1073 that detects a direction of motion by using a rotational inertia of the electronic apparatus 100. Further, the sensor unit 170 may include any of an acceleration sensor (not shown) that detects acceleration applied in three axes (e.g., x, y, and z-axes) to the electronic apparatus 100, a gravity sensor that detects a direction in which gravity is applied, and/or an altimeter that detects a height by measuring an atmospheric pressure.

The sensor unit 1070 may measure acceleration due to motion and acceleration due to gravity of the electronic apparatus 100. In addition, the sensor unit 1070 may further include a fingerprint sensor (not shown) that detects the user's fingerprint and/or a heart rate sensor (not shown) that detects the user's heart rate.

At least one sensor included in the sensor unit 1070 detects a state of the electronic apparatus 100, generates an electrical signal that corresponds to the detected state, and transmits the electrical signal to the controller 1020. It will be understood by one of one of ordinary skill in the art that at least one sensor included in the sensor unit 1070 may be added or deleted, in accordance with the performance of the electronic apparatus 100.

The storage 1080 may store signals or data that are input/output in response to operations of the communication interface 1010, the display 1030, the multimedia interface 1040, the GPS unit 1045, the camera 1050, the input/output interface 1060, and the sensor unit 1070, under the control of the controller 1020. For example, the storage 1080 may include a mobile communication module (not shown), a wireless LAN module (not shown), a short-distance communication module (not shown), a camera module (not shown), a sensor module (not shown), a touch screen module (not shown), a power module (not shown), and a multimedia module (not shown). Functions of the modules would be instinctively understood by one of ordinary skill in the art in view of their names and thus detailed descriptions thereof will be omitted herein.

According to an embodiment, the storage 1080 may store the AP connection information for connecting to the AP 300, under the control of the controller 1020.

The storage 1080 may store any of a graphical user interface (GUI) which is related to an application that is provided by a manufacturer or is uploaded from the outside and a control program for controlling the electronic apparatus 100 or the controller 1020, images for providing the GUI, user information, documents, databases, and/or related data.

The power supply 1090 may supply power to the elements 1010 through 1080 included in the electronic apparatus 100 under the control of the controller 1020. The power supply 1090 may supply, to the electronic apparatus 100, power that is input from an external power source (not shown) via a wired cable (not shown) that is connected to the connector 1065 under the control of the controller 1020. Further, the power supply 1090 may supply, to the elements 1010 through 1080 included in the electronic apparatus 100, power that is output from one or more batteries (not shown) disposed in the electronic apparatus 100, under the control of the controller 1020.

It will be understood by one of one of ordinary skill in the art that at least one of the elements included in the electronic apparatus 100 of FIG. 10 may be added or deleted, in accordance with the performance of the electronic apparatus 100.

Figure 11:
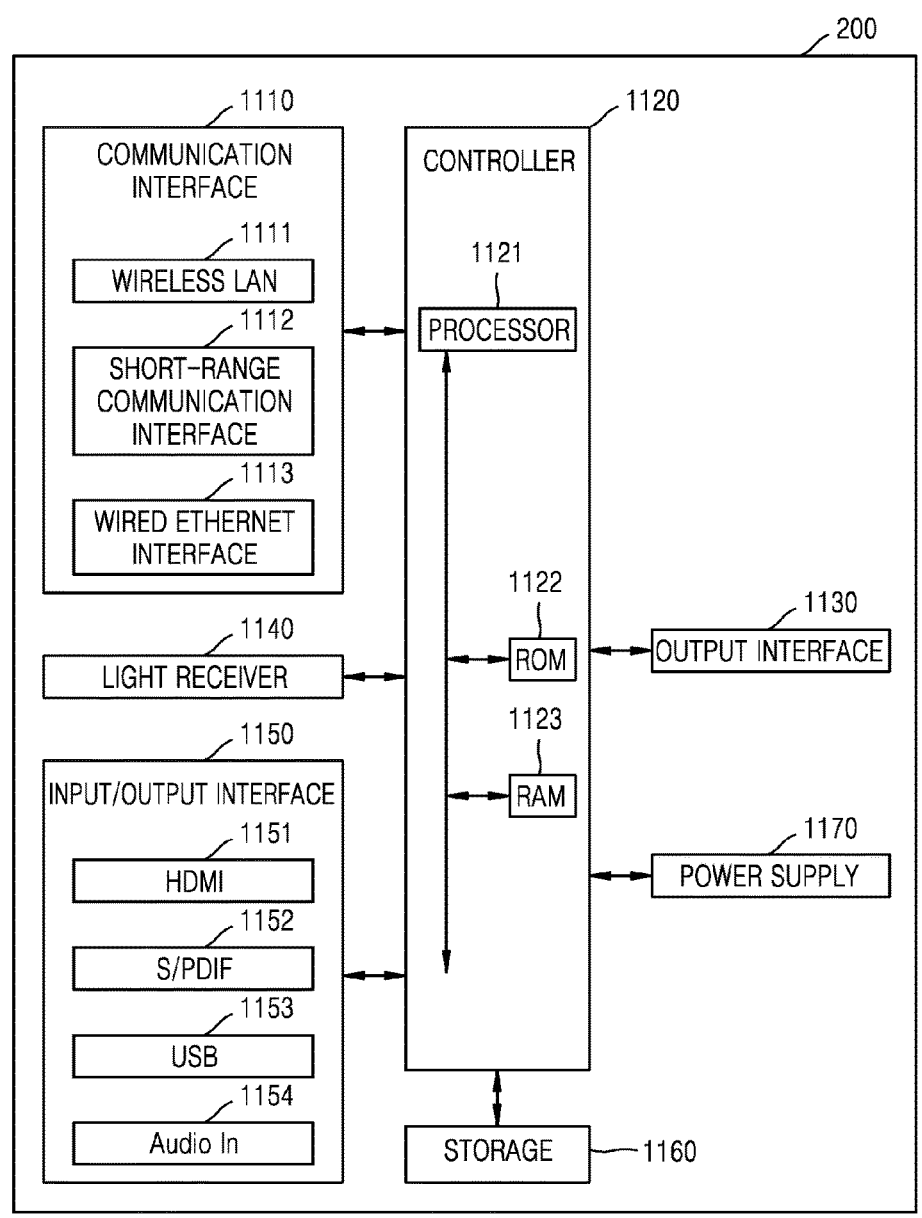
FIG. 11 is a block diagram illustrating an example structure of the audio device, according to an example embodiment.

FIG. 11 is a block diagram illustrating an example structure of the audio device 200, according to an example embodiment.

Referring to FIG. 11, the audio device 200 may include a light receiver 1140, an input/output interface (e.g., including input/output circuitry) 1150, a storage 1160, and/or a power supply 1170 in addition to a communication interface (e.g., including communication circuitry) 1110, a controller 1120, and an output interface (e.g., including output circuitry) 1130 respectively corresponding to the communication interface 410, the controller 420, and the output interface 430 of FIG. 4.

The communication interface 1110 may include one or more components including various communication circuitry capable of transmitting or receiving data to or from the AP 300 and/or the electronic apparatus 100 under the control of the controller 1120. The communication interface 1110 may include various communication circuitry, such as, for example, and without limitation, at least one of a wireless LAN 1111, a short-range communication interface 1112, and a wired Ethernet interface 1113. The communication interface 1110 may receive the AP connection information for connecting to the AP 300, from the electronic apparatus 100 under the control of the controller 1120. The communication interface 1110 may connect to the AP 300 by using the AP connection information under the control of the controller 1120. The communication interface 1110 corresponds to the communication interface 410 of FIG. 4, and thus a detailed description thereof will be omitted.

The controller 1120 includes a processor 1121. The controller 1120 may include the processor 1121 and a ROM 1122 in which a control program for controlling the audio device 200 is stored. Alternatively, the controller 1120 may include the processor 1121, the ROM 1122, and a RAM 1123 in which a signal or data which is received from the outside of the audio device 200 is stored and/or data that corresponds to various operations performed by the audio device 200 is stored. The controller 1120 may include an audio codec (not shown).

The controller 1120 controls an overall operation of the audio device 200 and the flow of signals between the elements 1110 through 1170 included in the audio device 200 and processes data. The controller 1120 controls the power supply 1170 to supply power to the elements 1110 through 1160.

When the audio device 200 is turned on, the controller 1120 may generate a probe request including an indicator that indicates a network setup between the audio device 200 and the AP 300. When the AP connection information is received from the electronic apparatus 100, the controller 1120 may control the communication interface 1110 to connect to the AP 300. The controller 1120 corresponds to the controller 420 of FIG. 4, and thus a detailed description thereof will be omitted.

The controller 1120 may output data received via the AP 300, via the output interface 1130. Alternatively, the controller 1120 may output the data received via the AP 300, to the input/output interface 1150 or an external speaker (not shown) connected to the audio device 200 via the communication interface 1110.

The output interface 1130 may include various output circuitry that outputs a received audio under the control of the controller 1120. The output interface 1130 may output an audio (for example, a voice, music, a sound, or an audio stream) that received via the communication interface 1110 or the input/output interface 1150. The output interface 1130 may be implemented using a 1-channel, 2-channel, or 2.1-channel speaker. The output interface 1130 may also be implemented using a 4-channel speaker, a 4.1-channel speaker, a 5.1-channel speaker, a 6.1-channel speaker, a 7.1-channel speaker, a 9.1-channel speaker, or a 11.2-channel speaker, but it will be understood by one of ordinary skill in the art that embodiments are not limited thereto.

The controller 1120 may up-mix the received audio (e.g., an audio from a 2.0-channel speaker) and may output the up-mixed audio to speakers (e.g., additional speakers (not shown)) of any of a 2.1-channel system, a 4-channel system, a 5-channel system, a 5.1-channel system, or a 7.1-channel system. The controller 1120 may down-mix audio (e.g., an audio from a 7.1-channel system) and may output the down-mixed audio to speakers of any of a 2-channel system, a 2.1-channel system, or a 5.1-channel system. The controller 1120 may output a received audio in consideration of the number of speakers of the output interface 1130 and the number of additional speakers. For example, when the number of speakers that corresponds to a received audio is equal to the number of speakers of a 5.1-channel system, the controller 1120 may output the received audio to the speakers (having, for example, a 5.1-channel system) of the output interface 1130. Alternatively, when the number of speakers that corresponds to a received audio is equal to the number of speakers of a 5.1-channel system, the controller 1120 may add additional speakers (having, for example, a 3-channel system) to the speakers (having, for example, a 2.1-channel system) of the output interface 1130 and may output the received audio to the speakers collectively having a 5.1-channel system.

The controller 1120 may provide any of various audio output effects (e.g., a movie, sports, a rock concert, and an orchestra) to the user, based on the number of the speakers of the output interface 1130.

The output interface 1130 may output audio data that is stored in the storage 1160 under the control of the controller 1120. The audio device 200 may output audio to an external apparatus (not shown) via the input/output interface 1150. For example, the controller 1120 may output audio to an additional speaker and/or to the electronic apparatus 100.

The light receiver 1140 receives an optical signal (including a control signal) from a remote controller (not shown) via a light window (not shown). The light receiver 1140 may receive an optical signal that corresponds to a user input (e.g., a touch, pressing, a touch gesture, a voice, or a motion) from the remote controller. The received optical signal may be converted and transmitted to the controller 1120. The control signal may be extracted from the received optical signal by the controller 1120.

The input/output interface 1150 may include various input/output circuitry configured to receive audio data from the outside under the control of the controller 1120. The input/output interface 1150 may receive video data from the outside under the control of the controller 1120. The input/output interface 1150 may output audio data to the outside under the control of the controller 1120. The input/output interface 1150 may output video data to the outside under the control of the controller 1120.

The input/output interface 1150 may include various input/output circuitry, such as, for example, and without limitation, any of a high-definition multimedia interface (HDMI) port 1151, a Sony/Philips digital interface format (S/PDIF) port 1152, a universal serial bus (USB) port 1153, and/or an audio-in jack 1154. It will be understood by one of ordinary skill in the art that the structure and operation of the input/output interface 1150 may be variously implemented according to embodiments.

The storage 1160 may store various data and a control program for driving and controlling the audio device 200 under the control of the controller 1120. The storage 1160 may store input/output signals or data that respectively correspond to operations of the communication interface 1110, the output interface 1130, the light receiver 1140, the input/output interface 1150, and the power supply 1170.

The storage 1160 may include a non-volatile memory, a volatile memory, a hard disk drive (HDD), or a solid state drive (SSD).

The storage 1160 may also store the name of the audio device 200. Accordingly, the controller 1120 may store a value obtained by adding an indicator to the name information of the audio device 200, in the SSID field of the probe request. The storage 1160 may also store the AP connection information received from the electronic apparatus 100.

The power supply 1170 supplies power that is input from an external power source to the elements 1110 through 1160 included in the audio device 200 under the control of the controller 1120. The power supply 1170 may supply, to the elements 1110 through 1160 included in the audio device 200, power that is output from one or more batteries (not shown) disposed in the audio device 200, under the control of the controller 1120.

At least one element of the elements included in the audio device 200 of FIG. 11 may be added or deleted in accordance with the performance of the audio device 200.

Further, it will be understood by one of ordinary skill in the art that locations of the elements of the electronic apparatus 100 of FIG. 10 and the audio device 200 of FIG. 11 may vary based on the performances or the structures of the electronic apparatus 100 and the audio device 200.

FIGS. 12-15 are flowcharts illustrating example methods in which the electronic apparatus 100 connects the audio device 200 to the AP 300, according to various example embodiments. The methods in which the electronic apparatus 100 connects the audio device 200 to the AP 300, according to disclosed embodiments, will now be described with reference to FIGS. 1-11 together with FIGS. 12-15. Though not stated, the above-described detailed contents and technical spirits are equally applied to the method of FIGS. 12-15. A repeated description of matters described above with reference to FIGS. 1-11 is omitted herein.

Figure 12:
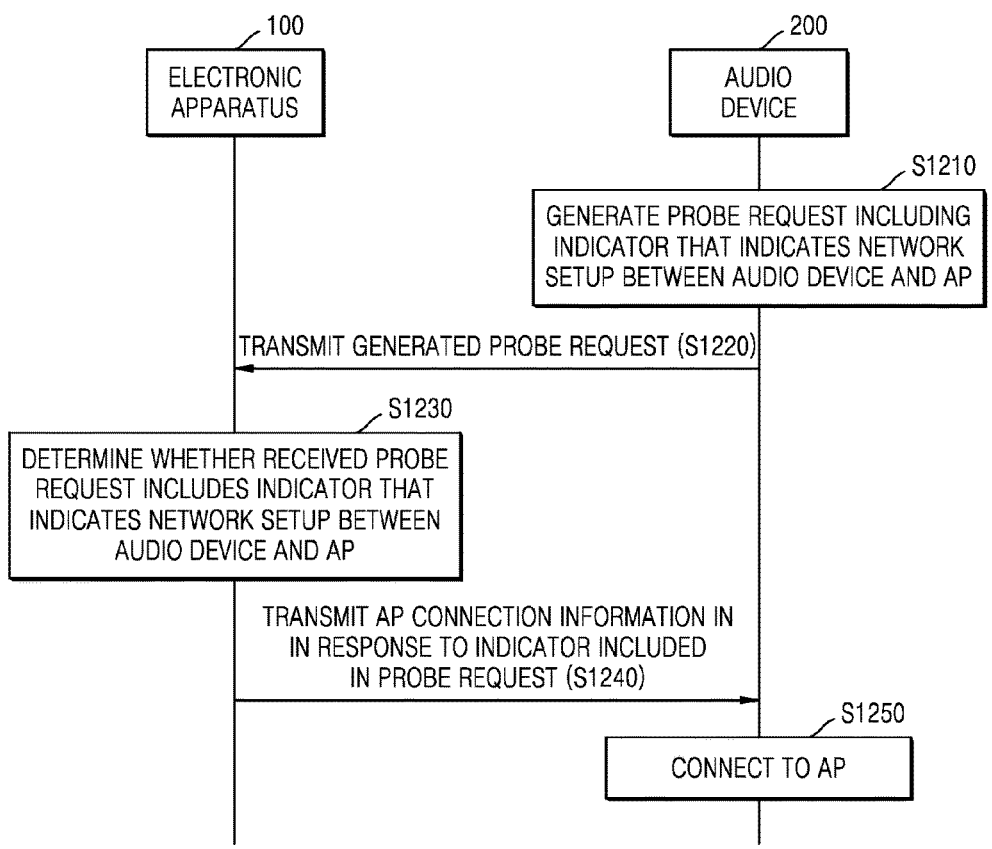
FIG. 12 is a flowchart illustrating an example method in which the electronic apparatus connects the audio device to an access point (AP), according to an example embodiment.

FIG. 12 is a flowchart illustrating an example method in which the electronic apparatus 100 connects the audio device 200 to the AP 300, according to an example embodiment.

Referring to FIG. 12, in operation S1210, the audio device 200 generates a probe request including an indicator that indicates a network setup between the audio device 200 and the AP 300. For example, when the audio device 200 is turned on, the audio device 200 may generate a probe request including an indicator that indicates a network setup with the AP 300. The indicator may be included in an SSID field of the probe request, and may be expressed as, for example, a character, a numeral, or a symbol included in ASCII code or Unicode, or a combination thereof.

Alternatively, the audio device 200 may generate a probe request including an indicator indicating a network setup with the AP 300, in response to a user input of a network setup button (e.g., a physical button, or a soft button when a display is included) included in the audio device 200.

Alternatively, when a beacon message that is broadcast by the electronic apparatus 100 is acquired, the audio device 200 may generate a probe request indicating an indicator indicating a network setup with the AP 300, based on the beacon message.

The probe request generated by the audio device 200 has already been described above with reference to FIG. 5B, and thus a detailed description thereof will be omitted.

In operation S1220, the audio device 200 may transmit the generated probe request. For example, the audio device 200 may broadcast the probe request at regular time intervals.

Alternatively, the audio device 200 may transmit the probe request to the electronic apparatus 100 by using the beacon message.

In operation S1230, the electronic apparatus 100 may receive the probe request and may determine whether the received probe request includes an indicator that indicates a network setup between the audio device 200 and the AP 300.

For example, the electronic apparatus 100 may provide a UI for receiving a user input of setting a network of an external audio device by using a WIFI network. In response to a user input to the UI, the electronic apparatus 100 may change a networking mode of the electronic apparatus 100 to an AP mode. The networking mode may include a client mode in which the electronic apparatus 100 operates as a client that connects to the AP 300, and an AP mode in which the electronic apparatus 100 operates as an AP. Accordingly, as the networking mode of the electronic apparatus 100 is changed to the AP mode, the electronic apparatus 100 may operate as an AP.

For example, as the networking mode of the electronic apparatus 100 is changed to the AP mode, the electronic apparatus 100 may receive probe requests from external devices. Accordingly, in operation S1220, the electronic apparatus 100 may receive the probe request broadcast by the audio device 200. Alternatively, as the networking mode of the electronic apparatus 100 is changed to the AP mode, the electronic apparatus 100 may broadcast a beacon message including an arbitrarily generated SSID and may receive a probe request from the audio device 200 having received the broadcast beacon message.

The electronic apparatus 100 may determine whether the received probe request includes an indicator that indicates a network setup between the audio device 200 having transmitted the probe request and the AP 300. For example, the electronic apparatus 100 may determine whether the indicator is included in an SSID field of the probe request received from the audio device 200. The indicator may be a pre-arranged value between the electronic apparatus 100 and the audio device 200 or may be a value generated by a specific algorithm.

In operation S1240, the electronic apparatus 100 transmits AP connection information to the audio device 200 in response to the indicator included in the probe request. The AP connection information is used to connect to the AP 300 via a WIFI network, and may include, for example, an SSID to which the AP 300 belongs, a MAC address of the AP 300, a security method, and password information.

For example, the electronic apparatus 100 may include the AP connection information in a user definition field of a probe response that is to be transmitted in response to the probe request. Alternatively, the electronic apparatus 100 may include only information indicating that the AP connection information is scheduled to be transmitted, in the user definition field of the probe response. In this case, after a WIFI communication connection between the electronic apparatus 100 and the audio device 200 is completed, the electronic apparatus 100 may transmit the AP connection information to the audio device 200. Accordingly, the electronic apparatus 100 may encrypt the AP connection information and may transmit the encrypted AP connection information to the audio device 200. The probe response transmitted by the electronic apparatus 100 has been described above with reference to FIGS. 6A and 6B, and thus a detailed description thereof will be omitted.

In operation S1250, the audio device 200 may connect to the AP 300 by using the received AP connection information.

When the communication connection with the AP 300 is completed, the audio device 200 may transmit a feedback message to the electronic apparatus 100. In response to the feedback message, the electronic apparatus 100 may terminate the AP mode. Further, the electronic apparatus 100 may re-connect to the AP 300. Thus, the electronic apparatus 100 and the audio device 200 may transmit or receive data to or from each other via the AP 300.

According to an embodiment, the electronic apparatus 100 may receive probe requests including an indicator from a plurality of audio devices. In this case, the electronic apparatus 100 may transmit the AP connection information to the plurality of audio devices. Alternatively, the electronic apparatus 100 may provide an audio device list including ID information of the plurality of audio devices and may receive a user input of selecting at least one audio device from the audio device list. In this case, the electronic apparatus 100 may transmit the AP connection information to the selected audio device. The embodiment of FIG. 8 is applicable to a method performed by the electronic apparatus 100 to provide the audio device list, and thus a detailed description of the method will be omitted.

Figure 13:
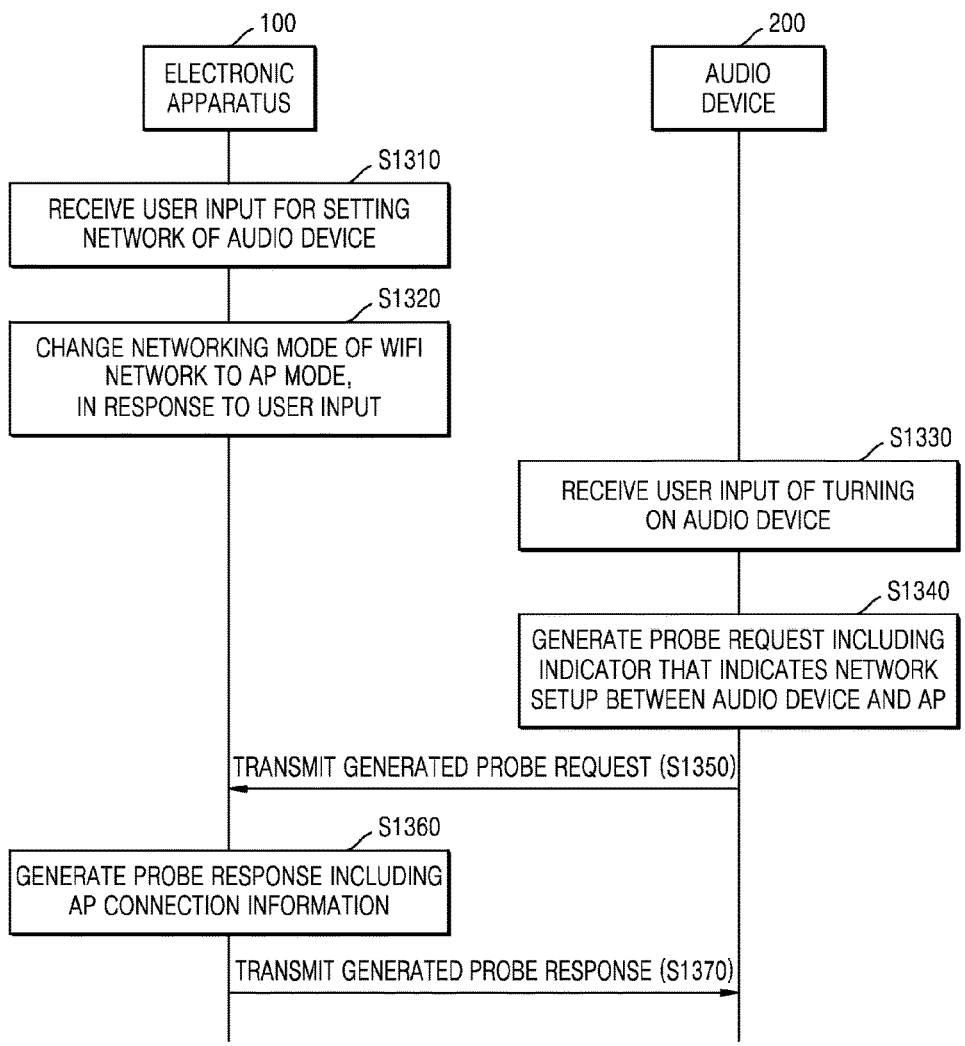
FIG. 13 is a flowchart illustrating an example method in which the electronic apparatus provides AP connection information for connecting to the AP to the audio device, according to an example embodiment.

FIG. 13 is a flowchart illustrating an example method in which the electronic apparatus 100 provides AP connection information for connecting to the AP 300 to the audio device 200, according to an example embodiment.

Referring to FIG. 13, in operation S1310, the electronic apparatus 100 may receive a user input for setting a network of the audio device 200. For example, the electronic apparatus 100 may provide a UI for receiving a user input, and may receive a user input to the UI.

In operation S1320, the electronic apparatus 100 may change a networking mode of a WIFI network to an AP mode, in response to the user input.

In operation S1330, the audio device 200 may receive a user input of turning on the audio device 200. Alternatively, the audio device 200 may receive an optical signal for turning on the audio device 200 from a remote controller.

In operation S1340, the audio device 200 may generate a probe request including an indicator that indicates a network setup with the AP 300.

In operation S1350, the audio device 200 may transmit the generated probe request to the electronic apparatus 100.

In operation S1360, the electronic apparatus 100 may generate a probe response including AP connection information in response to the probe request including the indicator. For example, the electronic apparatus 100 may add an SSID to which the AP 300 belongs, a MAC address of the AP 300, a security method, and password information to a user definition field of the probe response.

In operation S1370, the electronic apparatus 100 may transmit the generated probe response to the audio device 200.

Figure 14:
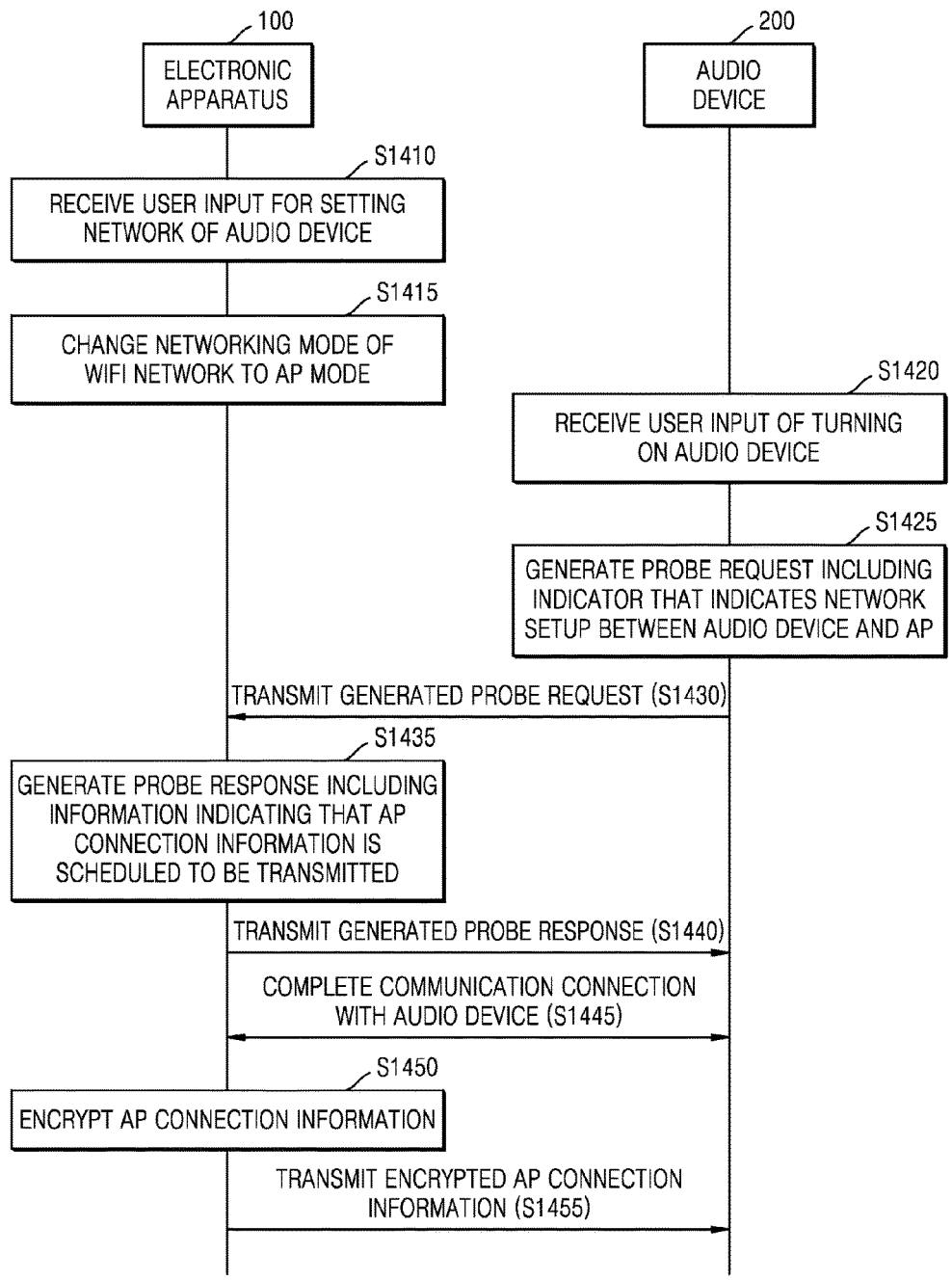
FIG. 14 is a flowchart illustrating an example method in which the electronic apparatus provides AP connection information for connecting to the AP to the audio device, according to another example embodiment.

FIG. 14 is a flowchart illustrating an example method in which the electronic apparatus 100 provides AP connection information for connecting to the AP 300 to the audio device 200, according to another example embodiment.

Referring to FIG. 14, in operation S1410, the electronic apparatus 100 may receive a user input for setting a network of the audio device 200.

In operation S1415, the electronic apparatus 100 may change a networking mode of a WIFI network to an AP mode, in response to the user input.

In operation S1420, the audio device 200 may receive a user input of turning on the audio device 200.

In operation S1425, the audio device 200 may generate a probe request including an indicator that indicates a network setup with the AP 300.

In operation S1430, the audio device 200 may transmit the generated probe request to the electronic apparatus 100.

In operation S1435, the electronic apparatus 100 may generate a probe response including information indicating that AP connection information is scheduled to be transmitted, in response to the probe request including the indicator. For example, the electronic apparatus 100 may add a specific bit (for example, 0xFF00) to a user definition field of the probe response.

In operation S1440, the electronic apparatus 100 may transmit the generated probe response to the audio device 200.

In operation S1445, the electronic apparatus 100 may complete a communication connection with the audio device 200. At this time, the electronic apparatus 100 and the audio device 200 may perform the authentication process and the coupling process of FIG. 1 and may not request for a password during the authentication process.

In operation S1450, the electronic apparatus 100 may encrypt the AP connection information. For example, the electronic apparatus 100 may encrypt the AP connection information via an encryption method transmitted to or received from the audio device 200 during the communication connection with the audio device 200. Alternatively, the electronic apparatus 100 may encrypt the AP connection information by using a specific algorithm.

In operation S1455, the electronic apparatus 100 may transmit the encrypted AP connection information to the audio device 200.

Figure 15:
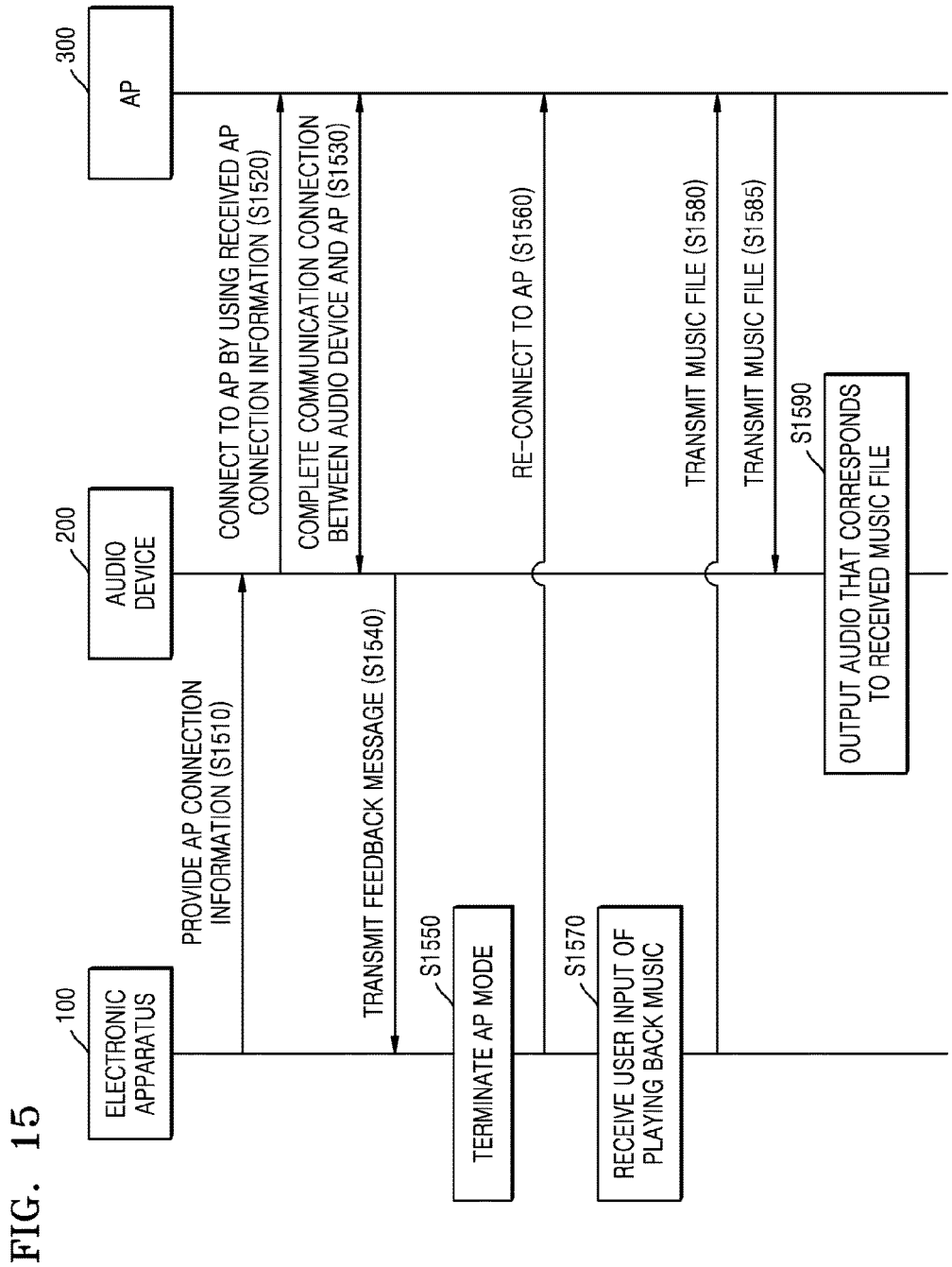
FIG. 15 is a flowchart illustrating an example method in which the electronic apparatus transmits a music file to the audio device connected to the AP, according to an example embodiment.

FIG. 15 is a flowchart illustrating an example method in which the electronic apparatus 100 transmits a music file to the audio device 200 connected to the AP 300, according to an embodiment.

Referring to FIG. 15, in operation S1510, the electronic apparatus 100 may provide AP connection information for connecting to the AP 300, to the audio device 200.

In operation S1520, the audio device 200 may connect to the AP 300 by using the received AP connection information.

In operation S1530, the audio device 200 and the AP 300 may complete a communication connection therebetween.

In operation S1540, the audio device 200 may transmit a feedback message indicating that the communication connection with the AP 300 has been completed, to the electronic apparatus 100.

In operation S1550, the electronic apparatus 100 may terminate the AP mode.

In operation S1560, the electronic apparatus 100 may re-connect to the AP 300. According to an embodiment, when the electronic apparatus 100 is able to operate in a plurality of networking modes or when the electronic apparatus 100 includes a plurality of wireless LANs, operation S1560 may be omitted.

In operation S1570, the electronic apparatus 100 may receive a user input of playing back music. For example, the electronic apparatus 100 may receive a user input of playing back music in a music playback application.

In operations S1580 and S1585, the electronic apparatus 100 may transmit a music file to the audio device 200 via the AP 300, in response the user input of playing back music.

In operation S1590, the audio device 200 may output an audio that corresponds to the received music file.

The above-described embodiments can be written as computer programs and can be implemented in general-use digital computers that execute the programs using a computer-readable recording medium.

Further, when a processor of a computer needs to communicate with any other remote computer or server in order to execute the above functions, the processor of the computer may further include information about how it may communicate with any other remote computer or server by using a communication module (e.g., a wired and/or wireless communication module) of the computer and/or information about which information or media it should transmit/receive for communication.

In addition, functional programs for accomplishing the present disclosure and codes and code segments related to the functional programs can be easily construed or changed by programmers skilled in the art to which the present disclosure pertains, by taking into account a system environment of computers that execute programs using a computer-readable recording medium.

Examples of the computer-readable recording medium include ROM, RAM, CD-ROMs, magnetic tapes, floppy discs, and optical data storage media.

The computer-readable recording medium can also be distributed over network coupled computer systems so that the computer readable code is stored and executed in a distributive manner. In this case, at least one of a plurality of distributed computers may execute some of the above functions and transmit the execution results to at least one of the other distributed computers, and the computer having received the results may also execute some of the above functions and provide the execution results to the other distributed computers.

Although it has been described above that all components comprising the above example embodiments are combined into one component or operate in a combined manner, the disclosure is not necessarily limited to the above embodiments. In other words, without departing from the scope of the disclosure, all the components may also be selectively combined into at least one component and operate. Further, although each of all the components may be implemented as one independent hardware unit, some or all of the components may be selectively combined to be implemented as a computer program having a program module that performs some or all of the functions combined in one or more hardware units. Codes and code segments that comprise the computer program may be easily inferred by one of ordinary skill in the art. The computer program may be stored in a computer-readable storage medium and may be read and executed by computers to implement the above embodiments. Examples of the storage medium of the computer program may include a magnetic recording medium and an optical recording medium.

The example embodiments should be considered in descriptive sense only and not for purposes of limitation. Descriptions of features or aspects within each embodiment should typically be considered as available for other similar features or aspects in other embodiments.

While the disclosure has been particularly illustrated and described with reference to example embodiments thereof, it will be understood by those of ordinary skill in the art that various changes in form and details may be made therein without departing from the spirit and scope of the present disclosure as defined by the following claims.

What is claimed is:

1. An electronic apparatus for use in connecting an external device to an access point (AP) via a wireless fidelity (WIFI) network, the electronic apparatus comprising:

communication circuitry; and a controller configured to at least:
control changing of a networking mode of the electronic apparatus to an AP mode in which the controller is capable of processing a probe request from the external device; and
in response to receiving, from the external device via the communication circuitry within a predetermined time period after the networking mode is changed to the AP mode, a probe request including an indicator used for requesting AP connection information required for setting up a network between the external device and the AP, control transmitting, to the external device, via the communication circuitry, AP connection information corresponding to the AP to cause the external device to connect to the AP.

2. The electronic apparatus of claim 1, wherein
the controller is configured to control providing a user interface (UI) for receiving an input for setting up a network connection for the external device, and, based on the input received via the UI, control the changing of the networking mode of the electronic apparatus to the AP mode.

3. The electronic apparatus of claim 1, wherein the AP connection information is included in a probe response to the probe request.

4. The electronic apparatus of claim 1, wherein the controller is configured to control encrypting of the AP connection information and providing of the encrypted AP connection information to the external device.

5. The electronic apparatus of claim 1, wherein
the communication circuitry is configured to control receiving of a feedback signal from the external device indicating that the communication connection between the external device and the AP is completed, and
the controller is configured to control, based on receiving the feedback signal, terminating of the AP mode.

6. The electronic apparatus of claim 1, wherein the indicator is included in a service set identifier (SSID) field of the probe request.

7. The electronic apparatus of claim 1, wherein the AP connection information comprises at least one of an SSID to which the AP belongs, a media access control (MAC) address of the AP, a security method, and password information.

8. An audio device connectable to an access point (AP) via a wireless fidelity (WIFI) network, the audio device comprising:
a controller configured to control generating a probe request including an indicator used for requesting AP connection information required for setting up a network between the audio device and the AP; and
communication circuitry configured to, under control of the controller, transmit the probe request to an electronic apparatus, receive AP connection information corresponding to the AP from the electronic apparatus based on the electronic apparatus receiving the probe request within a predetermined time period after the networking mode of the electronic apparatus is changed to the AP mode, in which the electronic apparatus is capable of processing the probe request from the audio device, and connect to the AP using the AP connection information.

9. The audio device of claim 8, wherein the communication circuitry is configured to, under control of the controller, transmit a feedback message to the electronic apparatus when a communication connection between the audio device and the electronic apparatus is completed.

10. The audio device of claim 8, wherein the indicator is included in a service set identifier (SSID) field of the probe request.

11. A method of connecting an external device to an access point (AP) via a wireless fidelity (WIFI) network, the method being performed by an electronic apparatus and comprising:
changing a networking mode to an AP mode in which the electronic apparatus is capable of processing a probe request from the external device; and
in response to receiving, from the external device via the communication circuitry within a predetermined time period after the networking mode is changed to the AP mode, a probe request including an indicator used for requesting AP connection information required for setting up a network between the external device and the AP, transmitting, to the external device, AP connection information corresponding to the AP to cause the external device to connect to the AP.

12. The method of claim 11, further comprising:
providing, by the electronic apparatus, a user interface (UI) for receiving an input for setting up a network connection for the external device; and
changing, based on the input received via the UI, the networking mode of the electronic apparatus to an AP mode.

13. The method of claim 11, wherein the AP connection information is included in a probe response to the probe request.

14. The method of claim 11, wherein the providing of the AP connection information to the external device comprises:
encrypting the AP connection information; and
transmitting the encrypted AP connection information to the external device.

15. The method of claim 12, further comprising:
receiving, by the electronic apparatus, a feedback signal from the external device indicating that the communication connection between the external device and the AP is completed; and
based on receiving the feedback signal, terminating the AP mode.

16. The electronic apparatus of claim 1, wherein the controller is configured to control changing the networking mode of the electronic apparatus to the AP mode from a client mode in which the electronic apparatus receives AP connection information from the AP.

17. The method of claim 11, wherein:
the networking mode is changed to the AP mode from a client mode in which the electronic device receives AP connection information from the AP.

* * * * *